US011239867B2

(12) United States Patent
Park et al.

(10) Patent No.: US 11,239,867 B2
(45) Date of Patent: Feb. 1, 2022

(54) ELECTRONIC DEVICE INCLUDING CIRCUIT CHANGING FEED PATH

(71) Applicant: Samsung Electronics Co., Ltd., Gyeonggi-do (KR)

(72) Inventors: Jeongwan Park, Gyeonggi-do (KR); Seho Kim, Gyeonggi-do (KR); Min Sakong, Gyeonggi-do (KR); Moonsoo Son, Gyeonggi-do (KR); Dongryul Shin, Gyeonggi-do (KR); Sooyoung Jang, Gyeonggi-do (KR); Yoonjae Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 14 days.

(21) Appl. No.: 16/552,329

(22) Filed: Aug. 27, 2019

(65) Prior Publication Data

US 2020/0067539 A1    Feb. 27, 2020

(30) Foreign Application Priority Data

Aug. 27, 2018    (KR) .................. 10-2018-0100429

(51) Int. Cl.
*H04B 1/00* (2006.01)
*H04B 1/40* (2015.01)
*H01Q 1/24* (2006.01)

(52) U.S. Cl.
CPC ............ *H04B 1/0064* (2013.01); *H04B 1/40* (2013.01); *H01Q 1/243* (2013.01)

(58) Field of Classification Search
CPC ........ H01Q 1/243; H01Q 23/00; H01Q 5/335; H01Q 5/35; H04B 1/0064; H04B 1/40
See application file for complete search history.

(56) References Cited

U.S. PATENT DOCUMENTS

| 9,685,694 B2 | 6/2017 | Choi et al. |
| 10,224,608 B2 | 3/2019 | Lee et al. |

(Continued)

FOREIGN PATENT DOCUMENTS

| CN | 107799885 | 3/2018 |
| CN | 108232419 | 6/2018 |

(Continued)

OTHER PUBLICATIONS

European Search Report dated Jul. 22, 2021 issued in counterpart application No. 19855901.5-1205, 12 pages.

(Continued)

*Primary Examiner* — David Bilodeau
(74) *Attorney, Agent, or Firm* — The Farrell Law Firm, P.C.

(57) ABSTRACT

An electronic device is provided that includes a first antenna element that includes a first portion of a housing, and a second antenna element that include a second portion of the housing that is different from the first portion of the housing. The electronic device also includes a memory that stores feed conditions, each for applying a current to one of the first antenna element and the second antenna element. A tuner of the electronic device is controlled such that a first current flows to one of the first antenna element and the second antenna element, based on a first feed condition of the stored feed conditions, and a processor of the electronic device transmits or receives a signal in a specified frequency band based on an electrical path formed through the tuner.

8 Claims, 21 Drawing Sheets

(56) References Cited

U.S. PATENT DOCUMENTS

| | | | |
|---|---|---|---|
| 10,305,166 B2 | 5/2019 | Kim et al. | |
| 10,305,170 B2 | 5/2019 | Kwak et al. | |
| 10,651,542 B2 | 5/2020 | Choi et al. | |
| 10,826,160 B2 | 11/2020 | Kwak et al. | |
| 11,075,447 B2 | 7/2021 | Choi et al. | |
| 2014/0125535 A1* | 5/2014 | Ramachandran | H01Q 21/28 343/745 |
| 2016/0164168 A1 | 6/2016 | Choi et al. | |
| 2017/0047637 A1 | 2/2017 | Kim et al. | |
| 2017/0047639 A1 | 2/2017 | Lee et al. | |
| 2017/0170562 A1* | 6/2017 | Lee | H01Q 9/14 |
| 2018/0026361 A1 | 1/2018 | Sakong et al. | |
| 2018/0034135 A1 | 2/2018 | Kwak et al. | |
| 2018/0083344 A1* | 3/2018 | Han | H01Q 19/021 |
| 2018/0294547 A1 | 10/2018 | Park et al. | |
| 2018/0331714 A1* | 11/2018 | See | H04B 1/58 |
| 2019/0273307 A1 | 9/2019 | Kwak et al. | |
| 2019/0312336 A1 | 10/2019 | Son et al. | |
| 2019/0363428 A1* | 11/2019 | Zhu | H01Q 9/0457 |
| 2020/0006842 A1* | 1/2020 | Zhu | H01Q 5/335 |
| 2021/0328330 A1 | 10/2021 | Choi et al. | |

FOREIGN PATENT DOCUMENTS

| | | |
|---|---|---|
| KR | 1020170018682 | 2/2017 |
| KR | 1020170019838 | 2/2017 |
| KR | 1020170040512 | 4/2017 |
| KR | 1020180010957 | 1/2018 |
| KR | 1020180014630 | 2/2018 |
| WO | WO 2018/012794 | 1/2018 |
| WO | WO 2018/026136 | 8/2018 |

OTHER PUBLICATIONS

Chinese Office Action dated Oct. 22, 2021 issued in counterpart application No. 201980056863.1, 20 pages.
International Search Report dated Jan. 31, 2020 issued in counterpart application No. PCT/KR2019/010858, 3 pages.

* cited by examiner

ELECTRONIC DEVICE INCLUDING CIRCUIT CHANGING FEED PATH

PRIORITY

This application is based on and claims priority under 35 U.S.C. § 119(a) to Korean Patent Application No. 10-2018-0100429, filed on Aug. 27, 2018, in the Korean Intellectual Property Office, the disclosure of which is incorporated by reference herein its entirety.

BACKGROUND

1. Field

The disclosure relates generally to mobile communication technologies, and more particularly, to a technology for changing a feed path depending on an operating environment of an electronic device.

2. Description of Related Art

Developing mobile communication technologies generally include an electronic device, such as a smartphone or wearable device, which is equipped with an antenna. The electronic device may transmit and/or receive various kinds of data (e.g., a message, a photo, a video, a music file, and/or a game) through the antenna.

An electronic device may switch antenna elements, based on a frequency band of a signal to be transmitted and/or received. For example, the electronic device may transmit and/or receive a signal in a low frequency band and/or a mid-frequency band by supplying a current to an antenna element disposed at a lower end of a housing thereof. In another example, the electronic device may transmit and/or receive a signal in a high frequency band by supplying a current to an antenna element disposed at a lower right end of the housing.

However, when a path through which a current is supplied to an antenna element is fixed, and an environment where the electronic device operates changes, the performance of the antenna may decrease. For example, when a user grips the electronic device with his/her left hand, a finger of the user may contact an antenna element placed at the lower right end of the housing, or may be adjacent thereto. In such an example, the performance of the antenna may decrease.

SUMMARY

Aspects of the present disclosure have been made to address at least the above problems and/or disadvantages and to provide at least the advantages described below.

Accordingly, an aspect of the present disclosure provides an electronic device that changes a feed structure based on an operating environment of the electronic device.

In accordance with an aspect of the disclosure, an electronic device is provided that includes a housing, a first antenna element including a first portion of the housing, and a second antenna element including a second portion of the housing that is different form the first portion of the housing, and a printed circuit board that is disposed in the housing. The electronic device also includes a memory that is disposed on the printed circuit board and stores feed conditions, each of which is for applying a current to one of the first antenna element and the second antenna element. The electronic device additionally includes a processor that is disposed on the printed circuit board and is electrically connected with the memory, at least one feed line that is disposed on the printed circuit board and is electrically connected with the processor, and a tuner that is electrically connected with the at least one feed line, the first antenna element, and the second antenna element. The processor controls the tuner such that a first current flows to one of the first antenna element and the second antenna element, based on a first feed condition of the stored feed conditions, and transmits or receives a signal in a specified frequency band based on an electrical path formed through the tuner.

In accordance with another aspect of the disclosure, an electronic device includes a housing that includes a first plate, a second plate facing away from the first plate, and a side member surrounding a space between the first plate and the second plate and is connected with the second plate or is integrally formed with the second plate, where the side member includes a first conduction part, a second conduction part, and an insulating part interposed between the first conduction part and the second conduction part. The electronic device also includes a printed circuit board that is interposed between the first plate and the second plate and includes at least one ground layer, and at least one wireless communication circuit that is disposed at the printed circuit board and includes a first electrical path processing a first signal in a first frequency band and a second electrical path processing a second signal in a second frequency band. The electronic device further includes a control circuit that includes a first node electrically connected with the first conduction part, a second node electrically connected with the second conduction part, a third node electrically connected with the first electrical path and the second electrical path, a first active element including a first terminal and a second terminal, the first terminal being electrically connected with the third node, a first switch electrically connected between the second terminal of the first active element and the first node, and a second switch electrically connected between the second terminal of the first active element and the second node.

BRIEF DESCRIPTION OF THE DRAWINGS

The above and other aspects, features, and advantages of certain embodiments of the disclosure will be more apparent from the following description when taken in conjunction with the accompanying drawings, in which.

DETAILED DESCRIPTION

Figure 1:
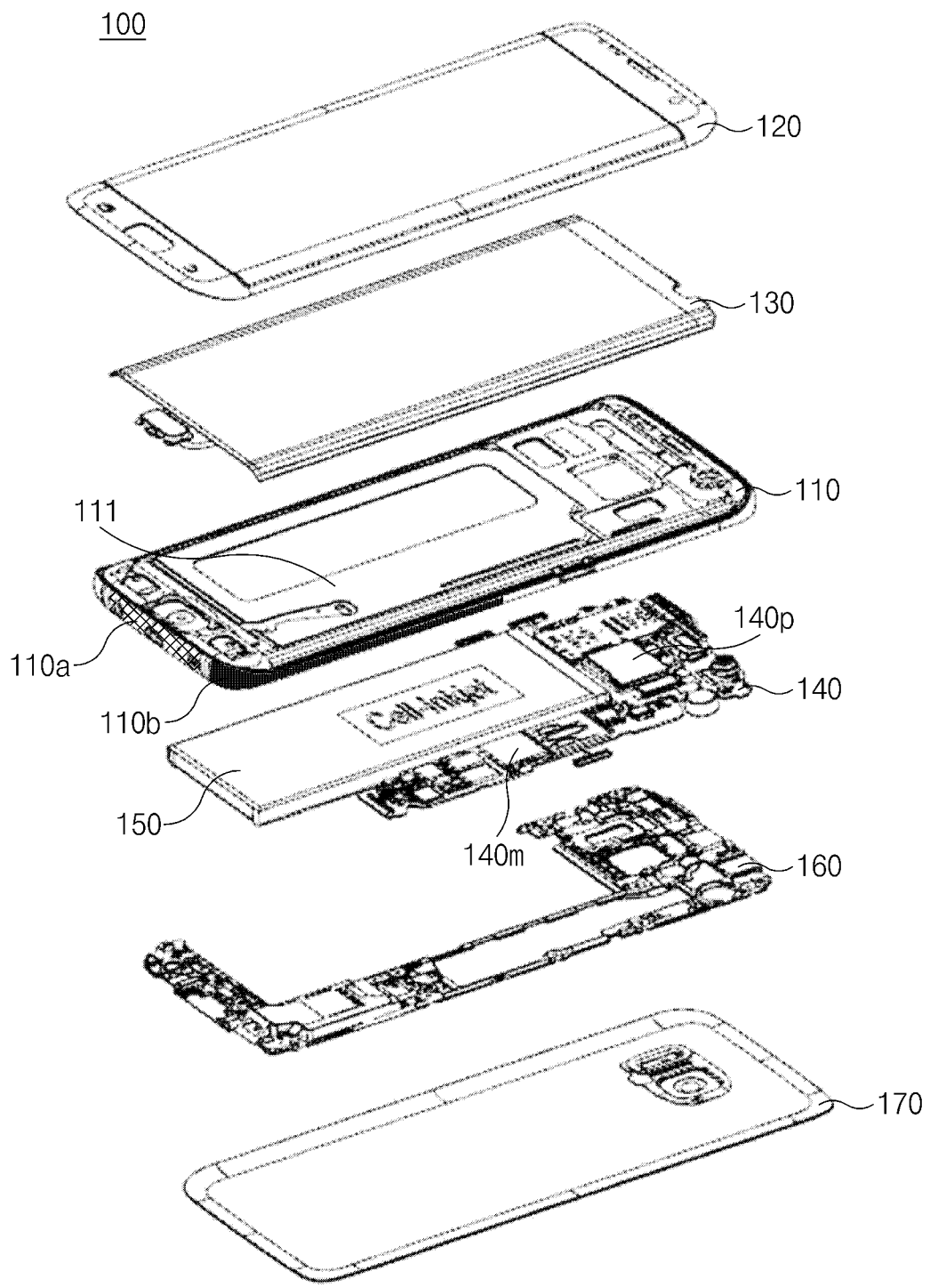
FIG. 1 is a diagram illustrating an exploded perspective view of an electronic device, according to an embodiment.

Hereinafter, various embodiments of the disclosure may be described with reference to accompanying drawings. Accordingly, those of ordinary skill in the art will recognize that modifications, equivalents, and/or alternatives of the various embodiments described herein can be made without departing from the scope and spirit of the disclosure.

With regard to description of drawings, similar elements may be marked by similar reference numerals.

FIG. 1 is a diagram illustrating an exploded perspective view of an electronic device, according to an embodiment.

Referring to FIG. 1, an electronic device 100 includes a side bezel structure 110, a first support member 111 (e.g., a bracket), a front plate 120 (or a first plate or a cover glass), a display 130, a printed circuit board 140, a communication module 140p, a memory 140m, a battery 150, a second support member 160 (e.g., a rear case), and a back plate 170 (or a second plate or a back cover). In alternative embodiments, the electronic device 100 may not include at least one (e.g., the first support member 111 or the second support member 160) of the components or may include one or more additional components.

The side bezel structure 110 includes antenna elements 110a and 110b. For example, a portion of the side bezel structure 110 may operate as a first antenna element 110a (or a first conduction part), and another portion thereof may operate as a second antenna element 110b (or a second conduction part).

The first support member 111 may be disposed in the electronic device 100 so as to be connected with the side bezel structure 110, or may be integrally formed with the side bezel structure 110. The first support member 111 may be formed of, for example, a metal material and/or a nonmetal material (e.g., polymer). The display 130 may be coupled with one surface of the first support member 111, and the printed circuit board 140 may be coupled with an opposite surface of the first support member 111. The communication module 140p, the memory 140m, and/or an interface may be mounted on the printed circuit board 140. For example, the communication module 140p may include one or more of a central processing unit, a wireless communication circuit, an application processor, a graphics processing unit, an image signal processor, a sensor hub processor, and a communication processor.

The memory 140m may include, for example, a volatile memory or a nonvolatile memory.

The interface may include, for example, a high definition multimedia interface (HDMI), a universal serial bus (USB) interface, a secure digital (SD) card interface, and/or an audio interface. The interface may electrically or physically connect, for example, the electronic device 100 with an external electronic device and may include a USB connector, an SD card/MMC connector, or an audio connector.

The battery 150, which is a device for supplying a power to at least one component of the electronic device 100, may include, for example, a primary cell incapable of being recharged, a secondary rechargeable cell, or a fuel cell. At least a portion of the battery 150 may be disposed on substantially the same plane as the printed circuit board 140, for example. The battery 150 may be integrally disposed in the electronic device 100 or may be disposed to be removable from the electronic device 100.

Figure 2A:
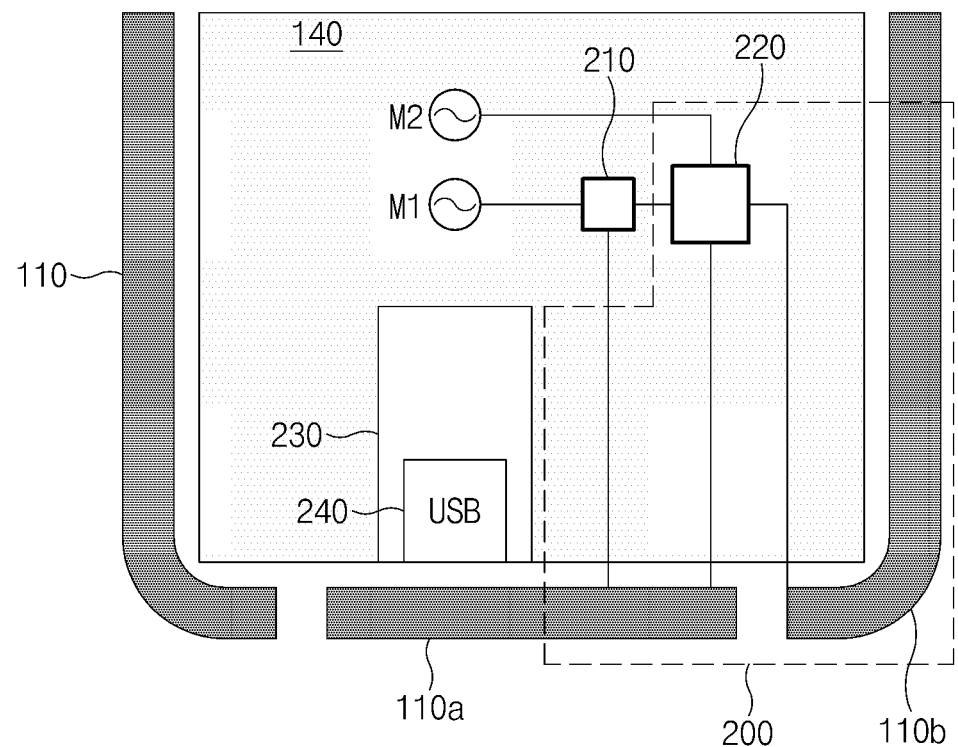
FIG. 2A a diagram illustrating a feed structure of an electronic device, according to an embodiment.
Figure 2B:
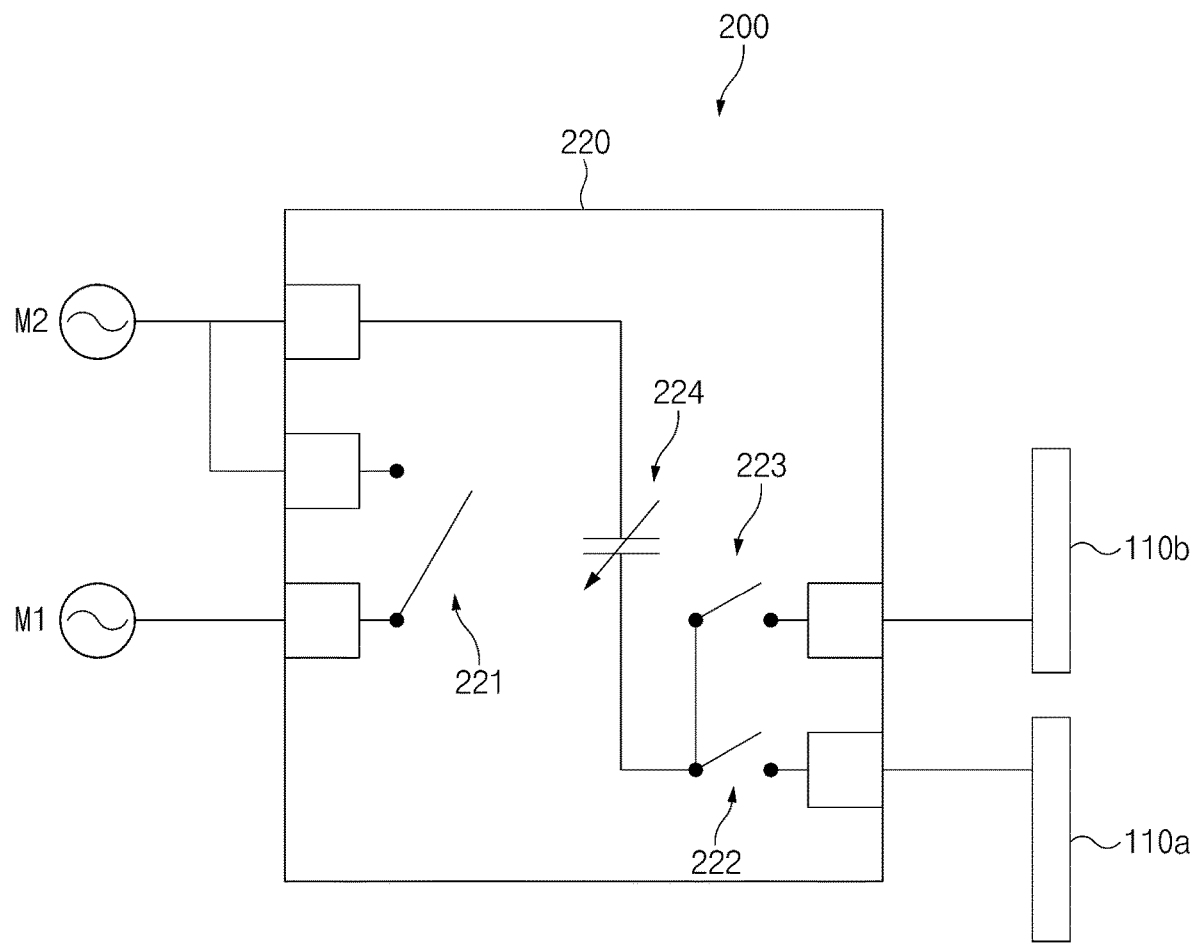
FIG. 2B is a diagram illustrating an enlarged view of a portion of a feed structure of an electronic device, according to an embodiment.

FIG. 2A is a diagram illustrating a feed structure of an electronic device, according to an embodiment. FIG. 2B is a diagram illustrating an enlarged view of a portion of a feed structure of an electronic device, according to an embodiment. FIG. 2B is an enlarged view of a portion 200 illustrated in FIG. 2A.

Referring to FIG. 2A, the electronic device 100 includes feed lines M1 and M2, a switch 210, and a tuner 220. For example, the feed lines M1 and M2, the switch 210, and the tuner 220 may be disposed on the printed circuit board 140. Herein, the feed lines M1 and M2 may be referred to as "transmission lines".

The feed lines M1 and M2 include a first feed line M1 and a second feed line M2. Each of the first feed line M1 and the second feed line M2 may be electrically connected with the communication module 140p. For example, the first feed line M1 and the second feed line M2 may be electrically connected with the communication module 140p through a specified wire (e.g., a flexible printed circuit board (FPCB)).

The switch 210 is disposed on a path where the first feed line M1 and the first antenna element 110a are connected. The communication module 140p may control the switch 210 such that the first feed line M1 and the tuner 220 are electrically connected through the switch 210. According to another embodiment, the communication module 140p may control the switch 210 such that the first feed line M1 and the first antenna element 110a are electrically connected. When the first feed line M1 and the tuner 220 are electrically connected, a current transmitted and/or received through the first feed line M1 may flow to the first antenna element 110a through the switch 210 and the tuner 220. When the first feed line M1 and the first antenna element 110a are directly connected, a current transmitted and/or received through the first feed line M1 may flow to the first antenna element 110a through the switch 210.

The tuner 220 is electrically connected with the switch 210, the second feed line M2, the first antenna element 110a, and the second antenna element 110b. The tuner 220 may allow a current applied through the first feed line M1 and/or the second feed line M2 to flow to the first antenna element 110a and/or the second antenna element 110b. For example, when the first feed line M1 and the tuner 220 are electrically connected through the switch 210, the tuner 220 may allow a current transmitted and/or received through the first feed line M1 to flow to the first antenna element 110a and/or the second antenna element 110b. Also, the tuner 220 may allow a current transmitted and/or received through the second feed line M2 to flow to the first antenna element 110a and/or the second antenna element 110b.

The electronic device 100 also includes a connection member 230 and a USB port 240. The connection member 230 may be disposed in the electronic device 100 to protect the USB port 240. The connection member 230 may be formed of metal. The USB port 240 may connect the electronic device 100 with an external electronic device. The electronic device 100 may transmit and/or receive data with the external electronic device through the USB port 240.

Referring to FIG. 2B, the tuner 220 includes a plurality of switches 221, 222, and 223, and a variable element 224.

The plurality of switches 221, 222, and 223 include a first switch 221, a second switch 222, and a third switch 223. The first switch 221 may be turned on in the case where the first feed line M1 and the tuner 220 will be connected. When the first switch 221 is turned on, a current transmitted and/or received through the first feed line M1 may flow to the first antenna element 110a and/or the second antenna element 110b through the first switch 221, the variable element 224, the second switch 222, and/or the third switch 223.

The second switch 222 and the third switch 223 may allow a current transmitted and/or received through the first feed line M1 and/or a current transmitted and/or received through the second feed line M2 to flow to the first antenna element 110a and/or the second antenna element 110b. For example, when the second switch 222 is turned on and the third switch 223 is turned off, a current transmitted and/or received through the first feed line M1 and/or a current transmitted and/or received through the second feed line M2 may flow to the first antenna element 110a. In another example, when the second switch 222 is turned off and the third switch 223 is turned on, a current transmitted and/or received through the first feed line M1 and/or a current transmitted and/or received through the second feed line M2 may flow to the second antenna element 110b.

The variable element 224 may select a specific frequency by changing a capacitance thereof. Herein, the variable element 224 may be referred to as a "first active element".

The description provided with respect to FIGS. 1, 2A, and 2B may be applied to components that have the same reference numerals (or marks) as the electronic device 100 illustrated in FIGS. 1, 2A, and 2B.

Figure 3A:
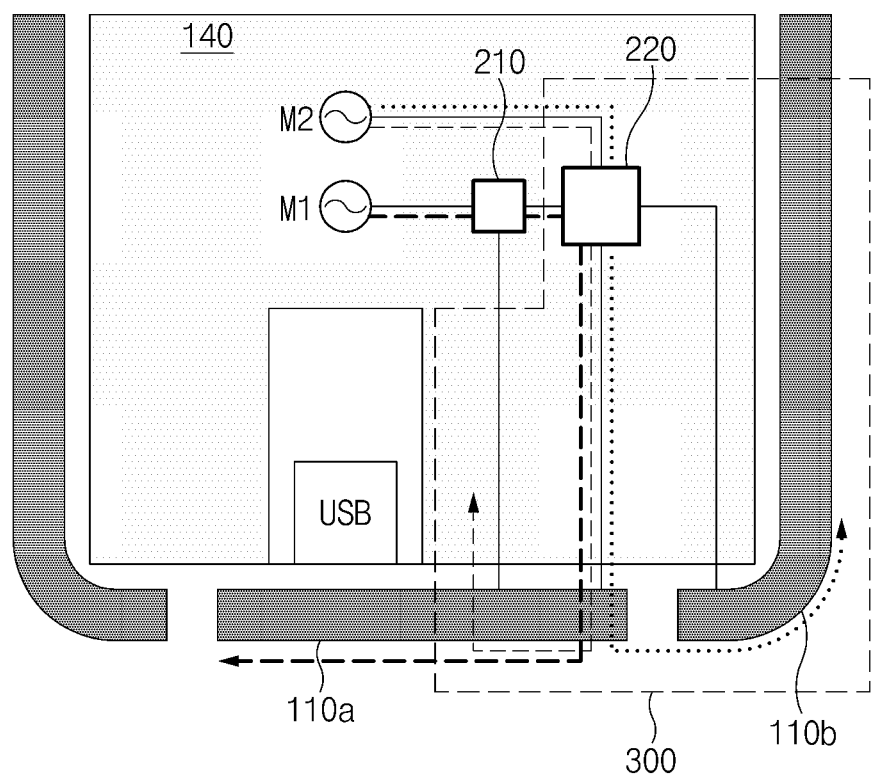
FIG. 3A is a diagram illustrating a feed structure of an electronic device, according to a first embodiment.
Figure 3B:
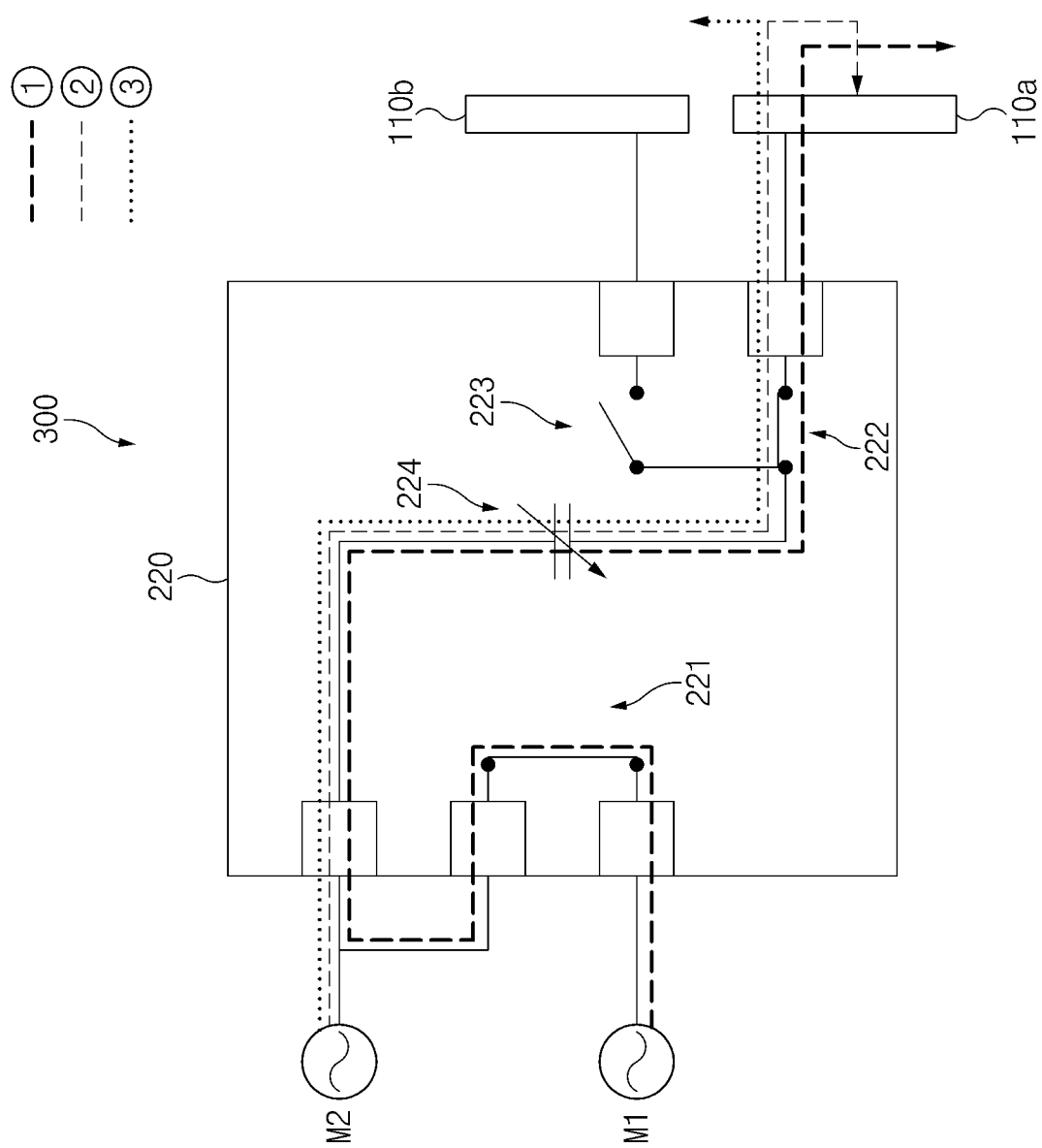
FIG. 3B is a diagram illustrating an enlarged view of a portion of a feed structure of an electronic device, according to the first embodiment.

FIG. 3A is a diagram illustrating a feed structure of an electronic device, according to a first embodiment. FIG. 3B is a diagram illustrating an enlarged view of a portion of a feed structure of an electronic device, according to the first embodiment. FIG. 3B is an enlarged view of a portion 300 illustrated in FIG. 3A. Feed structures according to a first embodiment, a second embodiment, and a third embodiment to be described below may be interchangeable depending on an operating environment of the electronic device 100.

Referring to FIG. 3A, the communication module 140p may transmit and/or receive a current to/from the first feed line M1 and/or the second feed line M2. In this case, the communication module 140p may control the switch 210 such that the first feed line M1 and the tuner 220 are connected. As such, a current transmitted and/or received through the first feed line M1 may flow to the first antenna element 110a and/or the second antenna element 110b through the first feed line M1, the switch 210, and the tuner 220. A current transmitted and/or received through the second feed line M2 may flow to the first antenna element 110a and/or the second antenna element 110b through the tuner 220.

Referring to FIG. 3B, the first switch 221 and the second switch 222 may be turned on, and the third switch 223 may be turned off. The current transmitted and/or received through the first feed line M1 may flow to the first antenna element 110a through the first switch 221, the variable element 224, and the second switch 222. The current transmitted and/or received through the second feed line M2 may flow to the first antenna element 110a through the first switch 221, the variable element 224, and the second switch 222. When the current is fed to the first antenna element 110a, the electronic device 100 may transmit and/or receive signals in a low frequency band (e.g., ranging from about 800 MHz to about 900 MHz), a mid-frequency band (e.g., ranging from about 1700 MHz to about 2100 MHz), and/or a high frequency band (e.g., ranging from about 2500 MHz to about 2700 MHz) through path ①, path ②, and path ③, respectively.

Figure 4A:
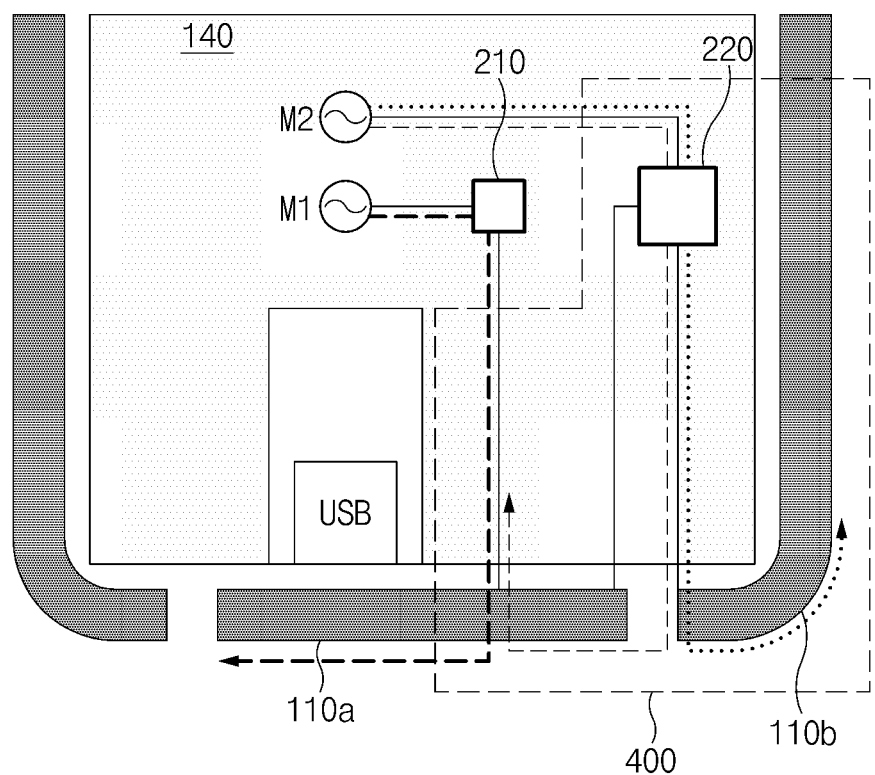
FIG. 4A is a diagram illustrating a feed structure of an electronic device, according to a second embodiment.
Figure 4B:
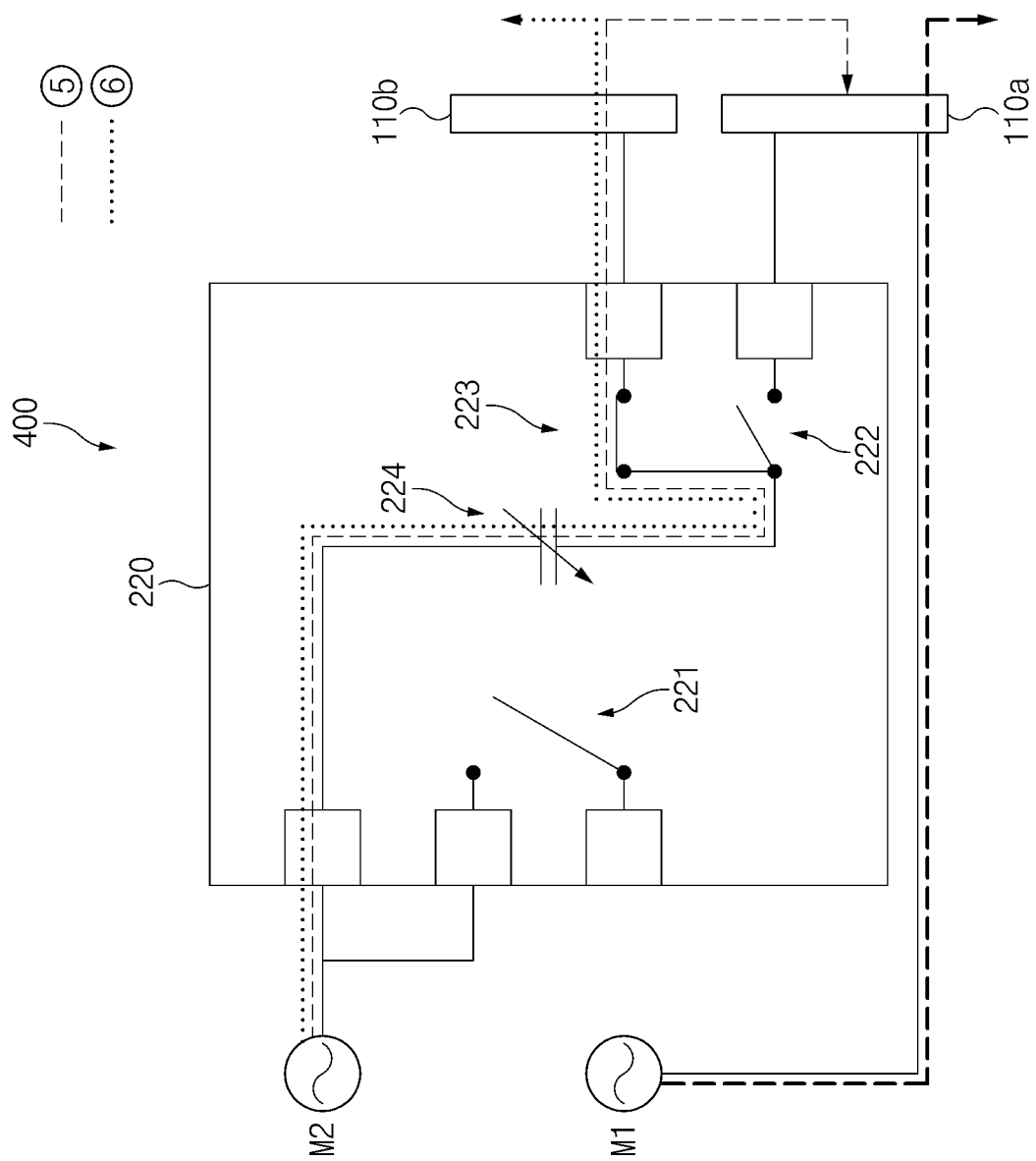
FIG. 4B is a diagram illustrating an enlarged view of a portion of a feed structure of an electronic device, according to the second embodiment.

FIG. 4A is a diagram illustrating a feed structure of an electronic device, according to a second embodiment. FIG. 4B is a diagram illustrating an enlarged view of a portion of a feed structure of an electronic device, according to the second embodiment. FIG. 4B is an enlarged view of a portion 400 illustrated in FIG. 4A.

Referring to FIG. 4A, the communication module 140p may transmit and/or receive a current to/from the first feed line M1 and/or the second feed line M2. A current transmitted and/or received through the first feed line M1 may flow to the first antenna element 110a through the first feed line M1. For example, the current transmitted and/or received through the first feed line M1 may flow to the first antenna element 110a from the first feed line M1 without passing through the tuner 220.

When a current is transmitted and/or received through the second feed line M2, the communication module 140p may control the tuner 220 such that the current transmitted and/or received through the second feed line M2 flows to the second antenna element 110b through the tuner 220.

Referring to FIGS. 4A and 4B, the first switch 221 and the second switch 222 may be turned off, and the third switch 223 may be turned on. The current transmitted and/or received through the second feed line M2 may flow to the second antenna element 110b through the variable element 224 and the third switch 223. When a current is independently fed to the first antenna element 110a and the second antenna element 110b, the electronic device 100 may transmit and/or receive signals in the low frequency band (e.g., ranging from about 800 MHz to about 900 MHz), the mid-frequency band (e.g., ranging from about 1700 MHz to about 2100 MHz), and/or the high frequency band (e.g., ranging from about 2500 MHz to about 2700 MHz) through path ④, path ⑤, and path ⑥, respectively.

The embodiment illustrated in FIGS. 4A and 4B is exemplary, and a current may be transmitted and/or received to/from the first antenna element 110a and the second antenna element 110b through a path that is different from the paths illustrated in FIGS. 4A and 4B. For example, the switch 210 and the tuner 220 may be connected, and the switch 210 may be turned on. The communication module 140p may transmit and/or receive a current through the first feed line M1 and the second feed line M2, and the current transmitted and/or received through the first feed line M1 may flow to the first antenna element 110a through the first switch 221, the variable element 224, and the second switch 222. The current transmitted and/or received through the second feed line M2 may flow to the second antenna element 110b through the variable element 224 and the third switch 223.

One or more of the components of the electronic device 100 illustrated in FIGS. 4A and 4B may be omitted. For example, the electronic device 100 may not include the switch 210 and/or the tuner 220. In the case where the switch 210 is not included, the first feed line M1 and the first antenna element 110a may be directly connected, and thus, a current transmitted and/or received through the first feed line M1 may flow through the first antenna element 110a. In another embodiment, when the tuner 220 is not included, one of the following connections may be made: a direct connection between the second feed line M2 and the second antenna element 110b, and both a connection between the second feed line M2 and the switch 210 and a connection between the switch 210 and the second antenna element 110b. A current transmitted and/or received through the second feed line M2 may be directly transmitted and/or received to the second antenna element 110b or may be transmitted and/or received to the second antenna element 110b through the switch 210.

Figure 5A:
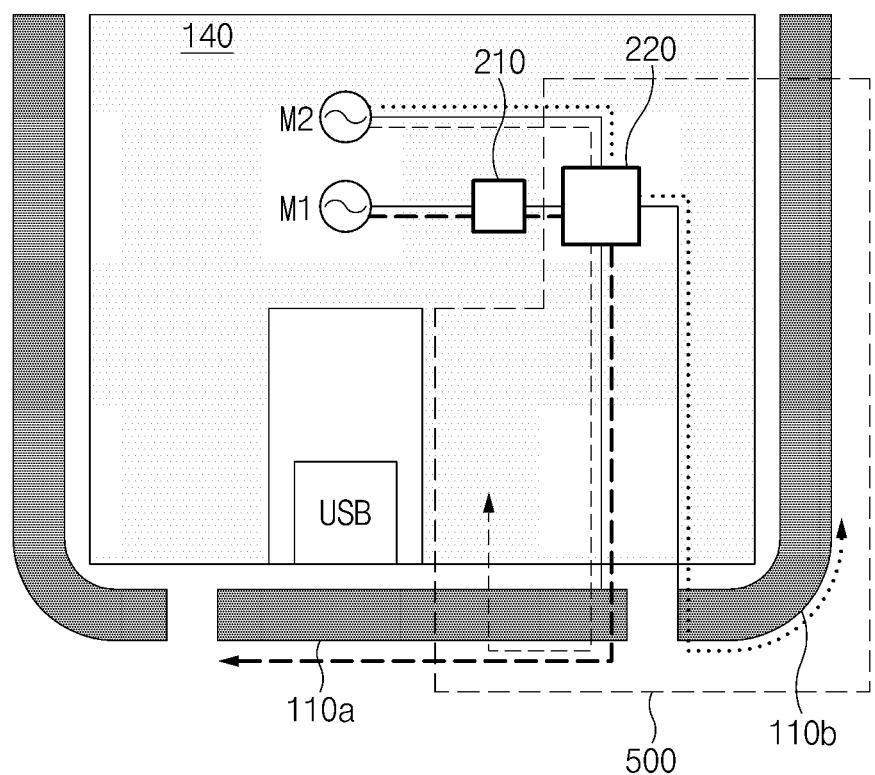
FIG. 5A is a diagram illustrating a feed structure of an electronic device, according to a third embodiment.
Figure 5B:
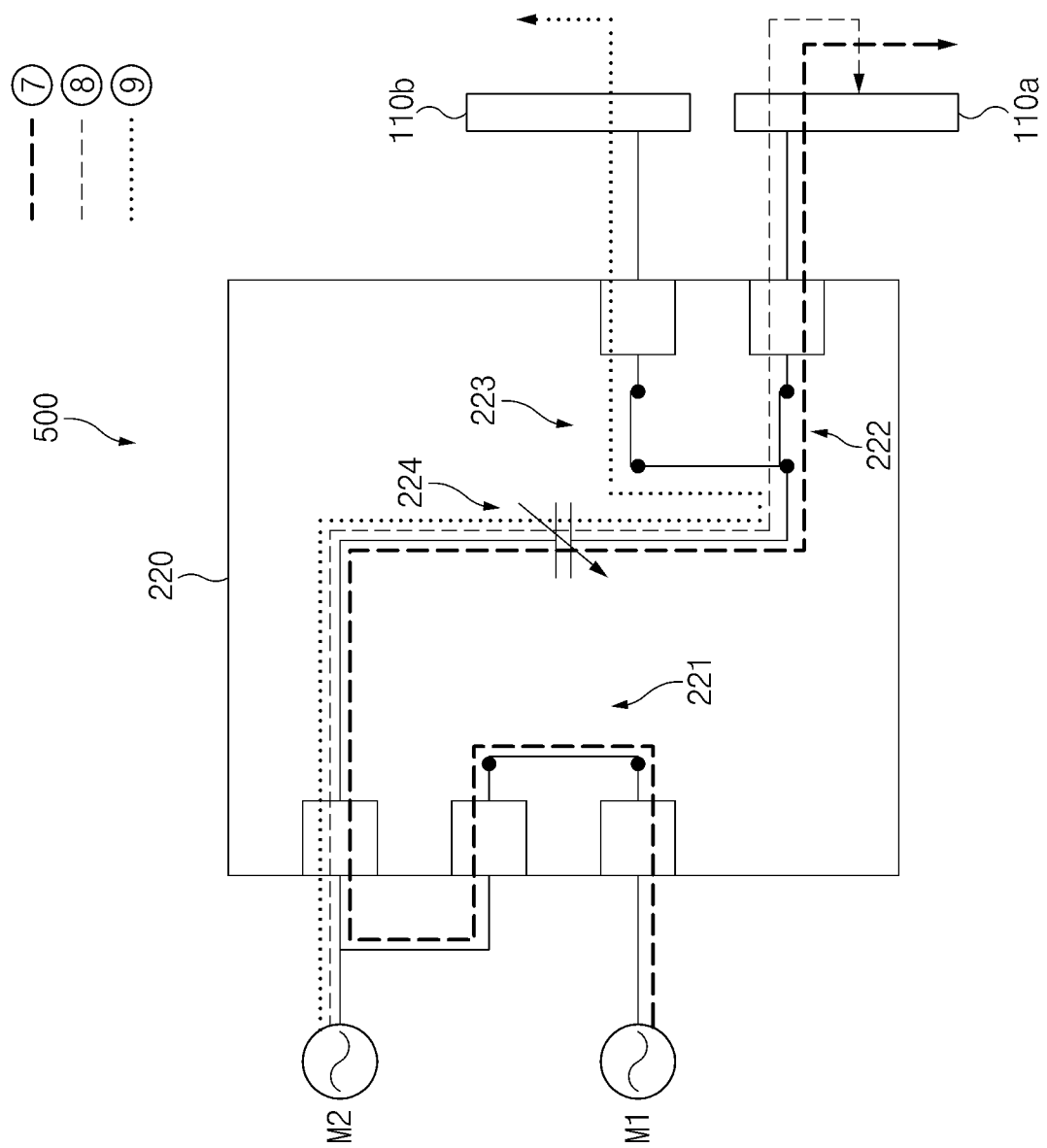
FIG. 5B is a diagram illustrating an enlarged view of a portion of a feed structure of an electronic device, according to the third embodiment.

FIG. 5A is a diagram illustrating a feed structure of an electronic device, according to a third embodiment. FIG. 5B is a diagram illustrating an enlarged view of a portion of a feed structure of an electronic device, according to the third embodiment. FIG. 5B is an enlarged view of a portion 500 illustrated in FIG. 5A.

Referring to FIG. 5A, the communication module 140p may transmit and/or receive a current to/from the first feed line M1 and/or the second feed line M2. In this case, the communication module 140p may control the switch 210 such that the first feed line M1 and the tuner 220 are connected. As such, a current transmitted and/or received through the first feed line M1 may flow to the first antenna element 110a through the first feed line M1, the switch 210, and the tuner 220. When a current is transmitted and/or received through the second feed line M2, the communication module 140p may control the tuner 220 such that the current transmitted and/or received through the second feed line M2 flows to the first antenna element 110a and the second antenna element 110b through the tuner 220.

Referring to FIG. 5B, the first switch 221, the second switch 222, and the third switch 223 may be turned on. The current transmitted and/or received through the first feed line M1 may flow to the first antenna element 110a and/or the second antenna element 110b through the first switch 221, the variable element 224, and the second switch 222. The current transmitted and/or received through the second feed line M2 may flow to the first antenna element 110a and the second antenna element 110b through the variable element 224, the second switch 222, and the third switch 223. When a current is independently fed to the first antenna element 110a and the second antenna element 110b, the electronic device 100 may transmit and/or receive signals in the low frequency band (e.g., ranging from about 800 MHz to about 900 MHz), the mid-frequency band (e.g., ranging from about 1700 MHz to about 2100 MHz), and/or the high frequency band (e.g., ranging from about 2500 MHz to about 2700 MHz) through path ⑦, path ⑧, and path ⑨, respectively.

TABLE 1

|  | Right hand grip | Left hand grip |
| --- | --- | --- |
| Low frequency band | First embodiment or third embodiment | Second embodiment |
| Mid-frequency band | Second embodiment | First embodiment |
| High frequency band | Second embodiment or third embodiment | First embodiment |

Table 1 illustrates a feed condition for applying a current to the first antenna element 110a and/or the second antenna element 110b. Referring to Table 1, when a user grips the electronic device 100 with his/her right hand, a ring finger and a little finger of the user may be adjacent to the first antenna element 110a. Accordingly, when a current is fed such that a feed path is spaced from the ring finger and the little finger of the user as much as a given distance, the performance of radiation of the electronic device 100 may satisfy a specified condition. For example, in the case of the low frequency band, radiation performance of the low frequency band may satisfy a specified condition by feeding a current like the first embodiment or the third embodiment, rather than the second embodiment. In the case of the mid-frequency band, radiation performance of the mid-frequency band may satisfy a specified condition by feeding a current like the second embodiment, rather than the first embodiment or the third embodiment. In the case of the high frequency band, radiation performance of the high frequency band may satisfy a specified condition by feeding a current like the second embodiment or the third embodiment, rather than the first embodiment.

When the user grips the electronic device 100 with his/her left hand, a ring finger and a little finger of the user may contact the second antenna element 110b or may be adjacent thereto. Accordingly, when a current is fed such that a feed path is spaced from the ring finger and the little finger of the user as much as a given distance, the performance of radiation of the electronic device 100 may satisfy a specified condition. For example, in the case of the low frequency band, radiation performance of the low frequency band may satisfy a specified condition by feeding a current like the second embodiment, rather than the first embodiment or the third embodiment. In the case of the mid-frequency band, radiation performance of the mid-frequency band may satisfy a specified condition by feeding a current like the first embodiment, rather than the second embodiment or the third embodiment. In the case of the high frequency band, radiation performance of the high frequency band may satisfy a specified condition by feeding a current like the first embodiment, rather than the second embodiment or the third embodiment.

An electronic device according to a comparative example fails to change a feed structure of the electronic device even though an operating environment of the electronic device is changed, as illustrated in Table 1. However, the electronic device 100 may stably maintain the performance of radiation of the electronic device 100 by changing a feed structure when an operating environment of the electronic device 100 is changed.

Embodiments of the present disclosure are exemplary and are not limited to the first to third embodiments. For example, the electronic device 100 may change a feed structure so as to be different in shape from the feed structures described with reference to the first to third embodiments. In another example, the electronic device 100 may change a feed structure based on the strength of a signal received from a base station, not a grip state of the user.

Figure 6A:
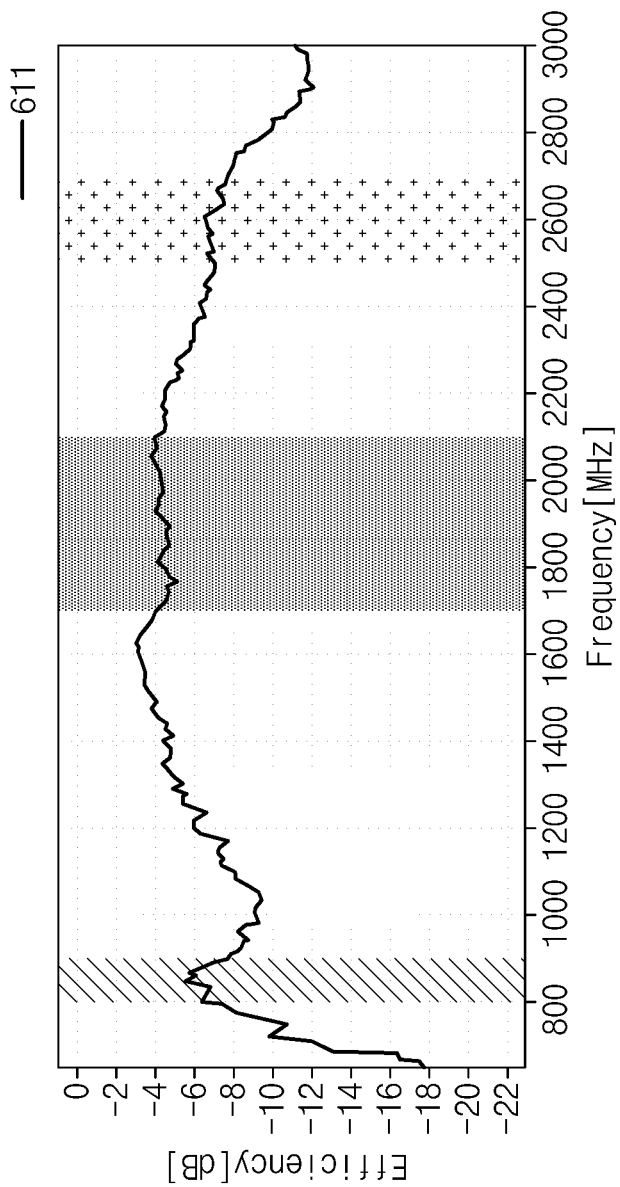
FIG. 6A is a chart illustrating a radiation efficiency of an electronic device, according to a first embodiment.
Figure 6B:
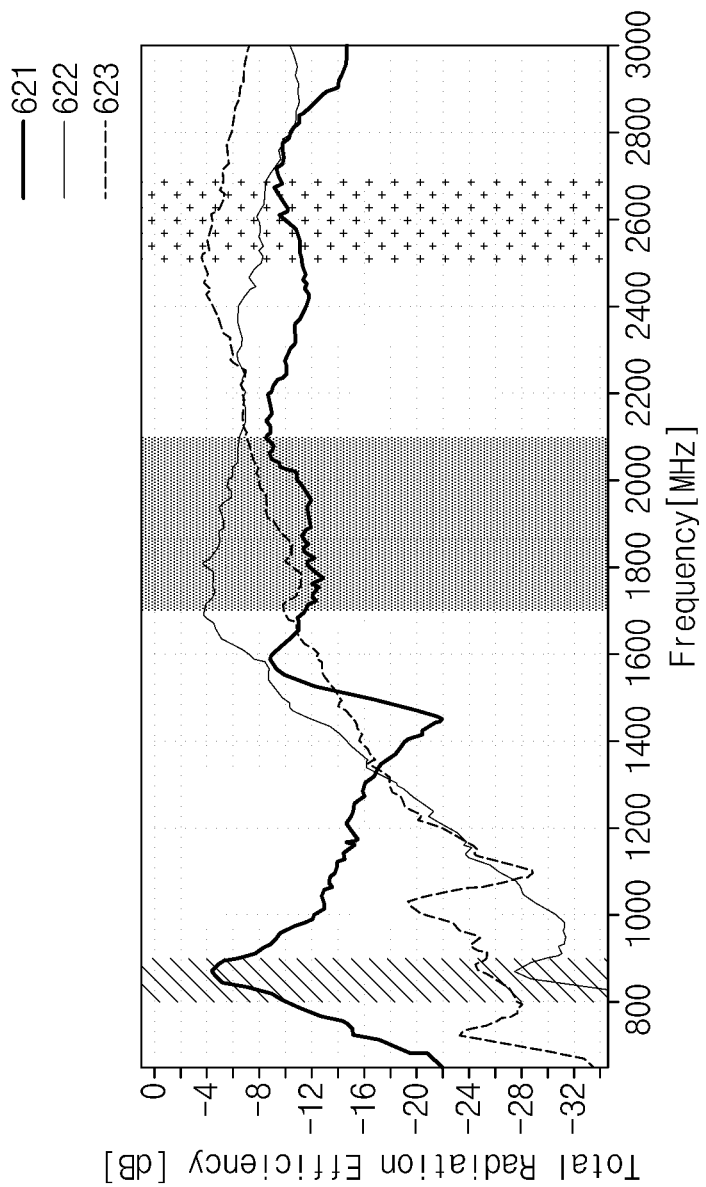
FIG. 6B is a chart illustrating a radiation efficiency of an electronic device, according to a second embodiment.
Figure 6C:
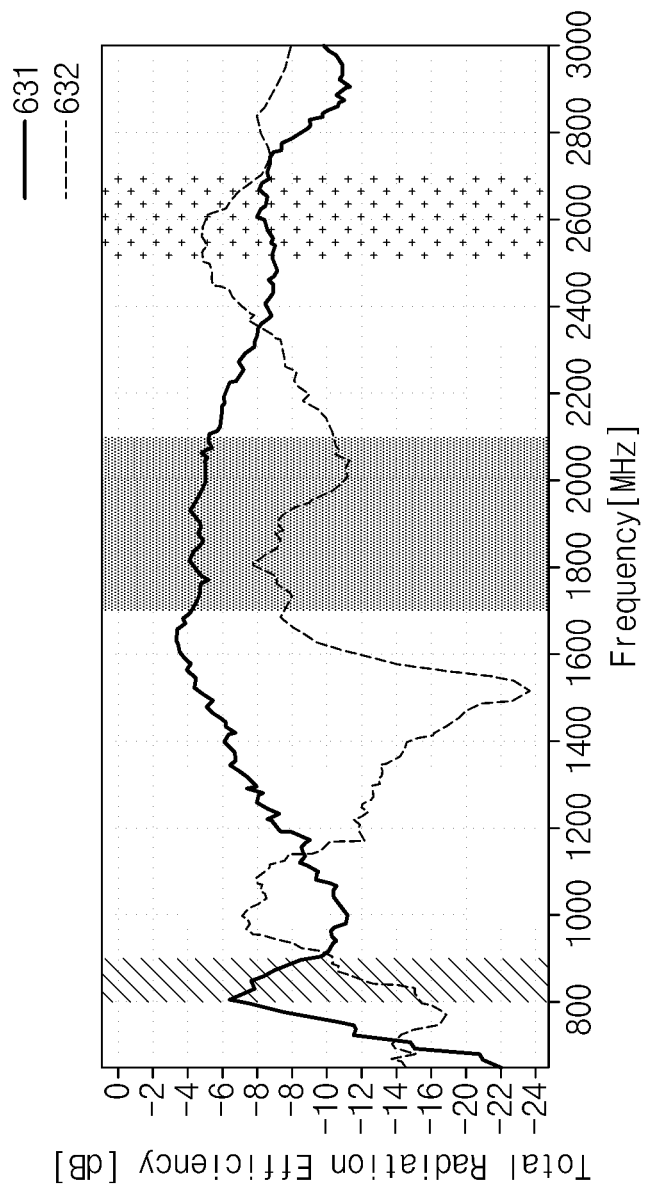
FIG. 6C is a chart illustrating a radiation efficiency of an electronic device, according to a third embodiment.

FIG. 6A is a chart illustrating a radiation efficiency of an electronic device, according to a first embodiment. FIG. 6B is a chart illustrating a radiation efficiency of an electronic device, according to a second embodiment. FIG. 6C is a chart illustrating a radiation efficiency of an electronic device, according to a third embodiment.

Graph 611 illustrated in FIG. 6A indicates a radiation efficiency of the electronic device 100 according to the first embodiment. Graph 621, graph 622, and graph 623 illustrated in FIG. 6B indicate radiation efficiencies by path ④, path ⑤, and path ⑥ in the second embodiment, respectively. Graph 631 and graph 632 illustrated in FIG. 6C indicate radiation efficiencies by paths ⑦ and ⑧ and path ⑨ in the third embodiment, respectively.

Referring to graph 611 of FIG. 6A, the radiation efficiency of the electronic device 100 may be a specified level or higher in the low frequency band, the mid-frequency band, and the high frequency band. For example, the radiation efficiency of the electronic device 100 may be about −8 dB or higher when a frequency band ranges from about 800 MHz to about 900 MHz, ranges from about 1700 MHz to about 2100 MHz, and ranges from about 2500 MHz to about 2700 MHz.

Referring to graph 621 of FIG. 6B, a radiation efficiency according to path ④ may be a specified level or higher in the low frequency band. For example, the radiation efficiency may be about −8 dB or higher from about 800 MHz to about 900 MHz. Referring to graph 622, a radiation efficiency according to path ⑤ may be a specified level or higher in the mid-frequency band. For example, the radiation efficiency may be about −6 dB or higher from about 1700 MHz to about 2100 MHz. Referring to graph 623, a radiation efficiency according to path ⑥ may be a specified level or higher in the high frequency band. For example, the radiation efficiency may be about −6 dB or higher from about 2500 MHz to about 2700 MHz.

Referring to graph 631 of FIG. 6C, radiation efficiencies according to path ⑦ and path ⑧ may be a specified level or higher in the low frequency band and the mid-frequency band. For example, the radiation efficiency may be about −8 dB or higher from about 800 MHz to about 900 MHz and from about 1700 MHz to about 2100 MHz. Referring to graph 632, a radiation efficiency according to path ⑨ may be a specified level or higher in the high frequency band. For example, the radiation efficiency may be about −8 dB or higher from about 2500 MHz to about 2700 MHz.

The electronic device 100 may stably maintain the performance of radiation of the electronic device 100 by changing a feed structure when an operating environment of the electronic device 100 is changed. For example, when an operating environment of the electronic device 100 is changed, the electronic device 100 may stably maintain the performance of radiation of the electronic device 100 by changing the feed structure according to the first embodiment, into the feed structure according to the second embodiment and/or the feed structure according to the third embodiment.

Figure 7A:
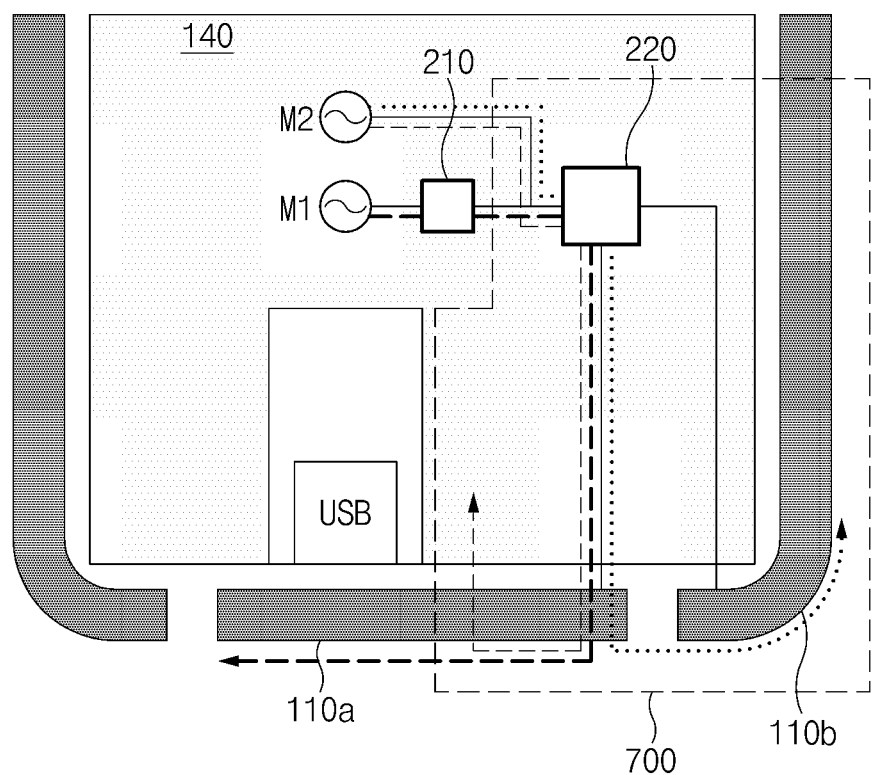
FIG. 7A is a diagram illustrating a feed structure of an electronic device, according to a fourth embodiment.
Figure 7B:
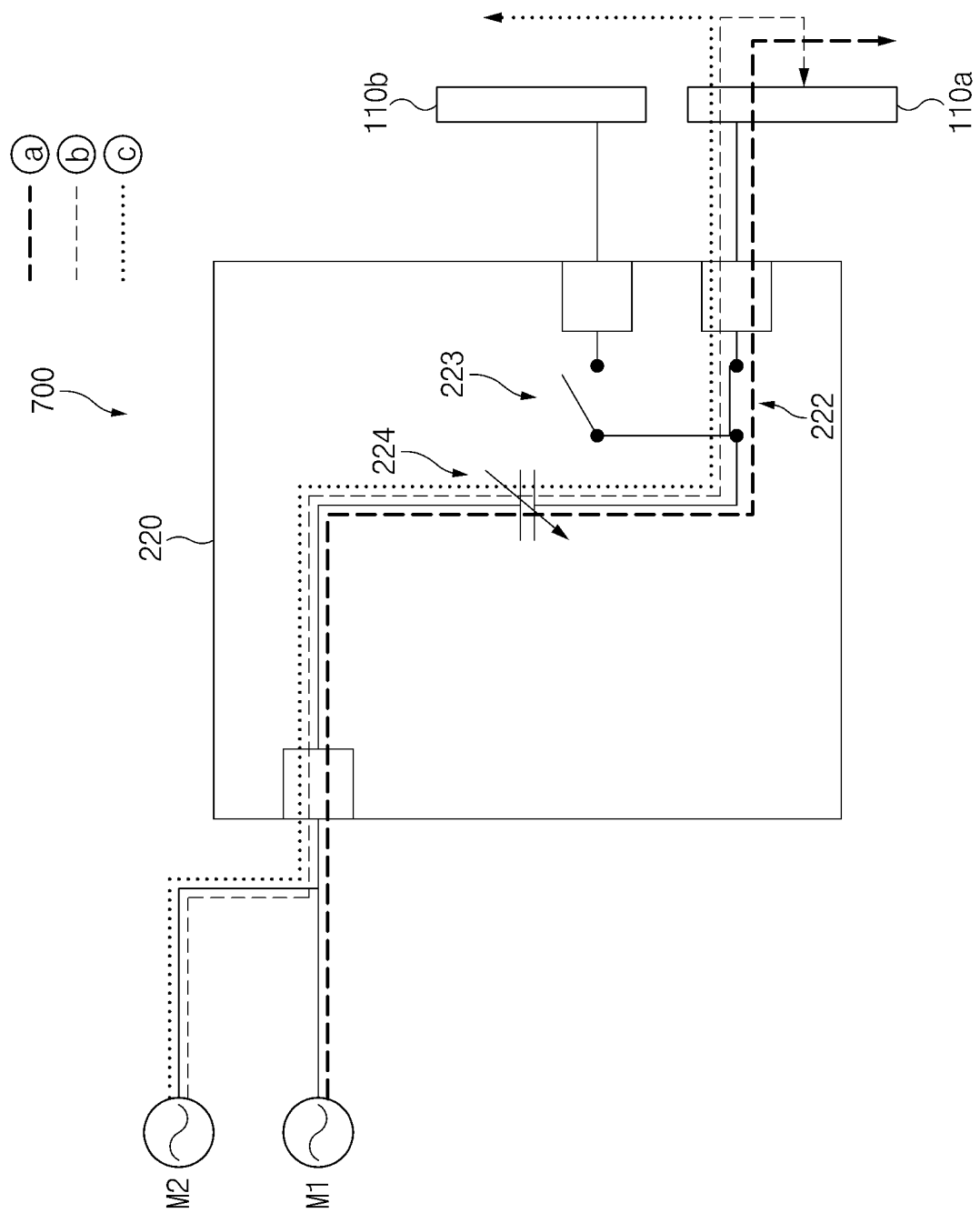
FIG. 7B is a diagram illustrating an enlarged view of a portion of a feed structure of an electronic device, according to the fourth embodiment.

FIG. 7A is a diagram illustrating a feed structure of an electronic device, according to a fourth embodiment. FIG. 7B is a diagram illustrating an enlarged view of a portion of a feed structure of an electronic device, according to the fourth embodiment. FIG. 7B is an enlarged view of a partial region 700 illustrated in FIG. 7A. A feed structure according to a fourth embodiment to be described below may be changeable depending on an operating environment of the electronic device 100.

Referring to FIG. 7A, the communication module 140p may transmit and/or receive a current to/from the first feed line M1 and/or the second feed line M2. In this case, the communication module 140p may control the switch 210 such that the first feed line M1 and the tuner 220 are connected. As such, a current transmitted and/or received through the first feed line M1 may flow to the first antenna element 110a and/or the second antenna element 110b through the first feed line M1, the switch 210, and the tuner 220. A current transmitted and/or received through the second feed line M2 may flow to the first antenna element 110a and/or the second antenna element 110b through the tuner 220. In the case of the fourth embodiment, the current transmitted and/or received through the first feed line M1 and the current transmitted and/or received through the second feed line M2 may be introduced through one terminal.

Referring to FIG. 7B, the second switch 222 is turned on, and the third switch 223 is turned off. The current transmitted and/or received through the first feed line M1 and the current transmitted and/or received through the second feed line M2 may flow to the first antenna element 110a through the variable element 224 and the second switch 222. When a current is fed to the first antenna element 110a, the electronic device 100 may transmit and/or receive signals in the low frequency band (e.g., ranging from about 800 MHz to about 900 MHz), the mid-frequency band (e.g., ranging from about 1700 MHz to about 2100 MHz), and/or the high frequency band (e.g., ranging from about 2500 MHz to about 2700 MHz) through path ⓐ, path ⓑ, and/or path ⓒ, respectively.

Figure 8A:
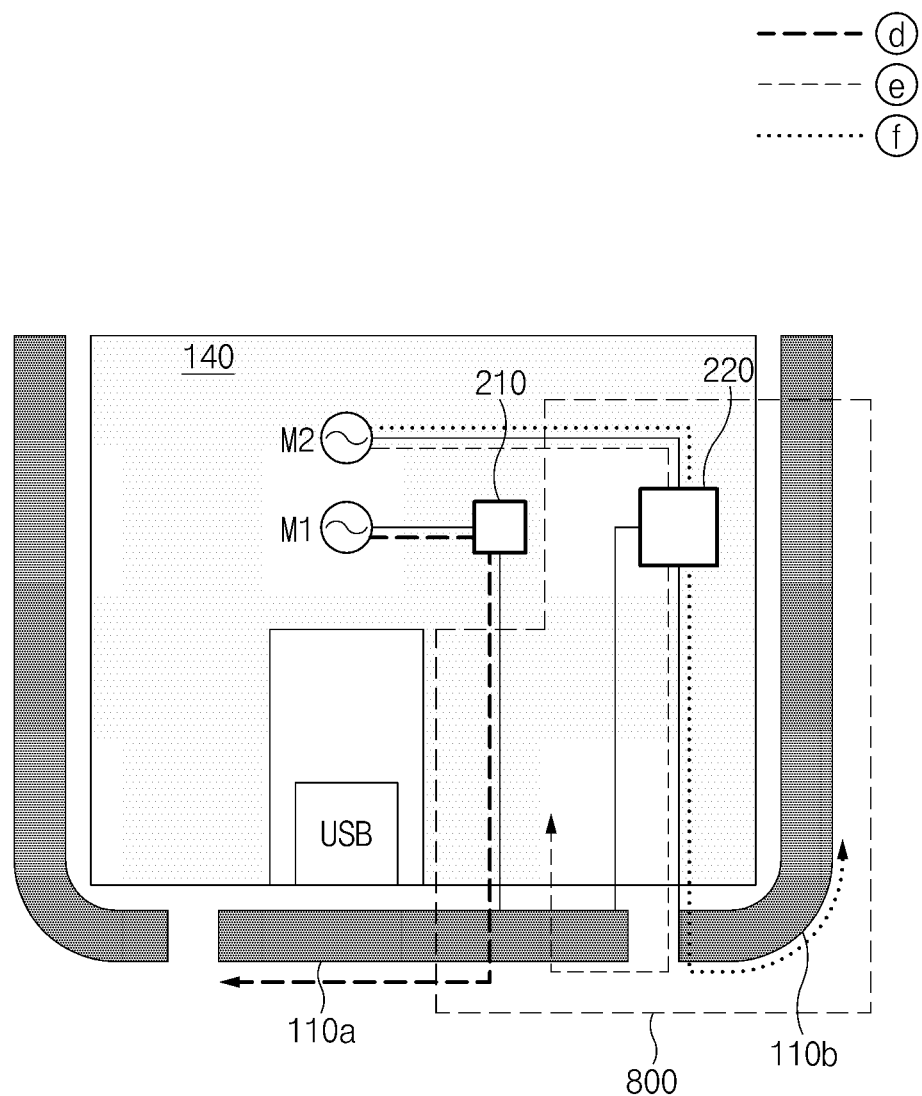
FIG. 8A is a diagram illustrating a feed structure of an electronic device, according to a fifth embodiment.
Figure 8B:
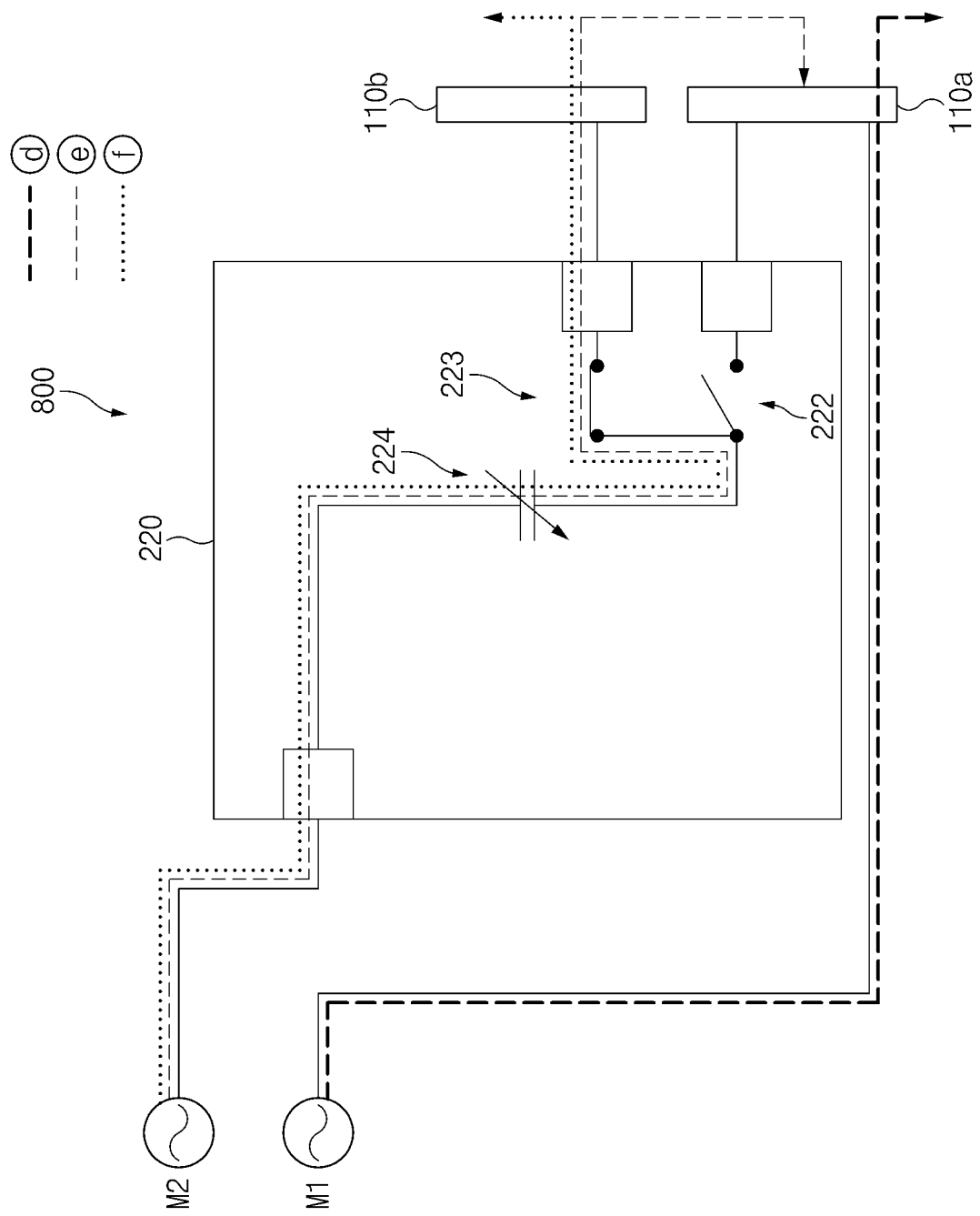
FIG. 8B is a diagram illustrating an enlarged view of a portion of a feed structure of an electronic device, according to the fifth embodiment.

FIG. 8A is a diagram illustrating a feed structure of an electronic device, according to a fifth embodiment. FIG. 8B is an enlarged view of a portion of a feed structure of an electronic device, according to the fifth embodiment. FIG. 8B is an enlarged view of a partial region 800 illustrated in FIG. 8A.

Referring to FIG. 8A, the communication module 140p may transmit and/or receive a current to the first feed line M1 and/or the second feed line M2. In this case, the communication module 140p may control the switch 210 such that the first feed line M1 and the first antenna element 110a are connected. As such, a current transmitted and/or received through the first feed line M1 may flow to the first antenna element 110a through the first feed line M1 and the switch 210. A current transmitted and/or received through the second feed line M2 may flow to the second antenna element 110b through the tuner 220.

Referring to FIG. 8B, the second switch 222 is turned off, and the third switch 223 is turned on. A current transmitted and/or received through the second feed line M2 may flow to the second antenna element 110b through the variable element 224 and the third switch 223. When a current is fed to the first antenna element 110a and the second antenna element 110b, the electronic device 100 may transmit and/or receive signals in the low frequency band (e.g., ranging from about 800 MHz to about 900 MHz), the mid-frequency band (e.g., ranging from about 1700 MHz to about 2100 MHz), and/or the high frequency band (e.g., ranging from about 2500 MHz to about 2700 MHz) through path ⓓ, path ⓔ and/or path ⓕ, respectively.

An electronic device according to a comparative example fails to change a feed structure of the electronic device even though an operating environment of the electronic device is changed. However, the electronic device 100, according to an embodiment of the present disclosure, may stably maintain the performance of radiation of the electronic device 100 by changing a feed structure when an operating environment of the electronic device 100 is changed. For example, when an operating environment of the electronic device 100 is changed, the electronic device 100 may change the feed structure according to the fourth embodiment into the feed structure according to the fifth embodiment.

Figure 9A:
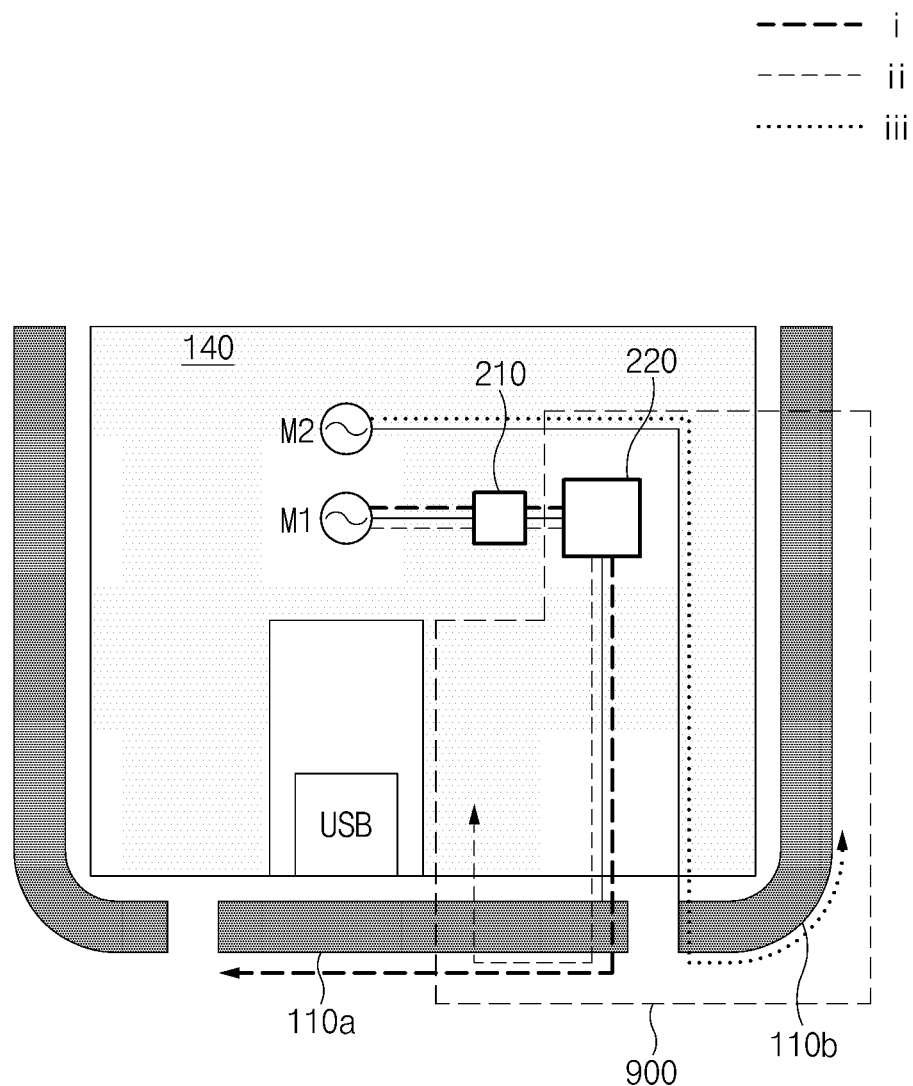
FIG. 9A is a diagram illustrating a feed structure of an electronic device, according to a sixth embodiment.
Figure 9B:
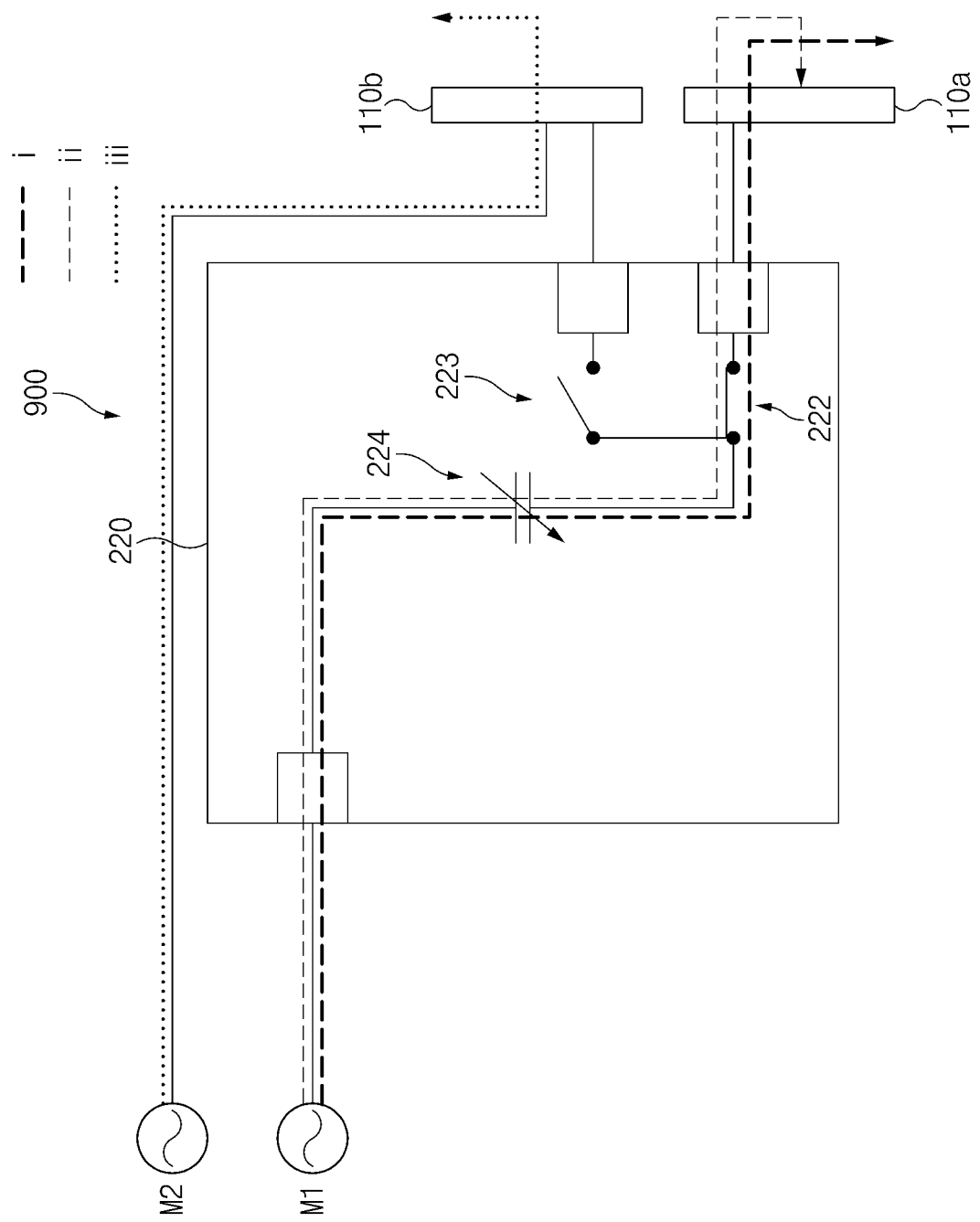
FIG. 9B is a diagram illustrating an enlarged view of a portion of a feed structure of an electronic device, according to the sixth embodiment.

FIG. 9A is a diagram illustrating a feed structure of an electronic device, according to a sixth embodiment. FIG. 9B is a diagram illustrating an enlarged view of a portion of a feed structure of an electronic device, according to the sixth embodiment. FIG. 9B is an enlarged view of a partial region 900 illustrated in FIG. 9A. Feed structures according to a sixth embodiment and a seventh embodiment to be described below may be interchangeable depending on an operating environment of the electronic device 100.

Referring to FIG. 9A, the communication module 140p may transmit and/or receive a current to/from the first feed line M1 and/or the second feed line M2. In this case, the communication module 140p may control the switch 210 such that the first feed line M1 and the tuner 220 are connected. As such, a current transmitted and/or received through the first feed line M1 may flow to the first antenna element 110a through the first feed line M1, the switch 210, and the tuner 220. A current transmitted and/or received through the second feed line M2 may flow to the second antenna element 110b without passing through the tuner 220. In the case of the sixth embodiment, a current transmitted and/or received through the second feed line M2 may be introduced directly to the second antenna element 110b.

Referring to FIG. 9B, the second switch 222 is turned on, and the third switch 223 is turned off. The current transmitted and/or received through the first feed line M1 may flow to the first antenna element 110a through the variable element 224 and the second switch 222. A current transmitted and/or received through the second feed line M2 may flow to the second antenna element 110b without passing through the tuner 220. When a current is fed to the first antenna element 110a and/or the second antenna element 110b, the electronic device 100 may transmit and/or receive signals in the low frequency band (e.g., ranging from about 800 MHz to about 900 MHz), the mid-frequency band (e.g., ranging from about 1700 MHz to about 2100 MHz), and/or the high frequency band (e.g., ranging from about 2500 MHz to about 2700 MHz) through path "i", path "ii", and path "iii", respectively.

The embodiment illustrated in FIGS. 9A and 9B is exemplary, and a current may be transmitted and/or received to the first antenna element 110a and the second antenna element 110b through a path that is different from the paths illustrated in FIGS. 9A and 9B. For example, the second feed line M2 and the tuner 220 may be connected, and the tuner 220 may be connected to the second antenna element 110b. The communication module 140p may transmit and/or receive a current through the first feed line M1 and the second feed line M2, and a current transmitted and/or received through the first feed line M1 may flow to the first antenna element 110a through the variable element 224 and the second switch 222. A current transmitted and/or received through the second feed line M2 may flow to the second antenna element 110b through the variable element 224 and the third switch 223.

Alternatively, one or more of the components of the electronic device 100 illustrated in FIGS. 9A and 9B may be omitted. For example, the electronic device 100 may not include the switch 210 and/or the tuner 220. In the case where the switch 210 is not included, the first feed line M1 and the first antenna element 110a may be connected directly or through the tuner 220. A current transmitted and/or received through the first feed line M1 may be directly transmitted and/or received to the first antenna element 110a or may be transmitted and/or received to the first antenna element 110a through the tuner 220. In another embodiment, when the tuner 220 is not included, one of the following connections may be established: direct connection between the second feed line M2 and the second antenna element 110b, and both a connection between the second feed line M2 and the switch 210 and a connection between the switch 210 and the second antenna element 110b. A current transmitted and/or received to the second feed line M2 may be directly transmitted and/or received to the second antenna element 110b or may be transmitted and/or received to the second antenna element 110b through the switch 210.

Figure 10A:
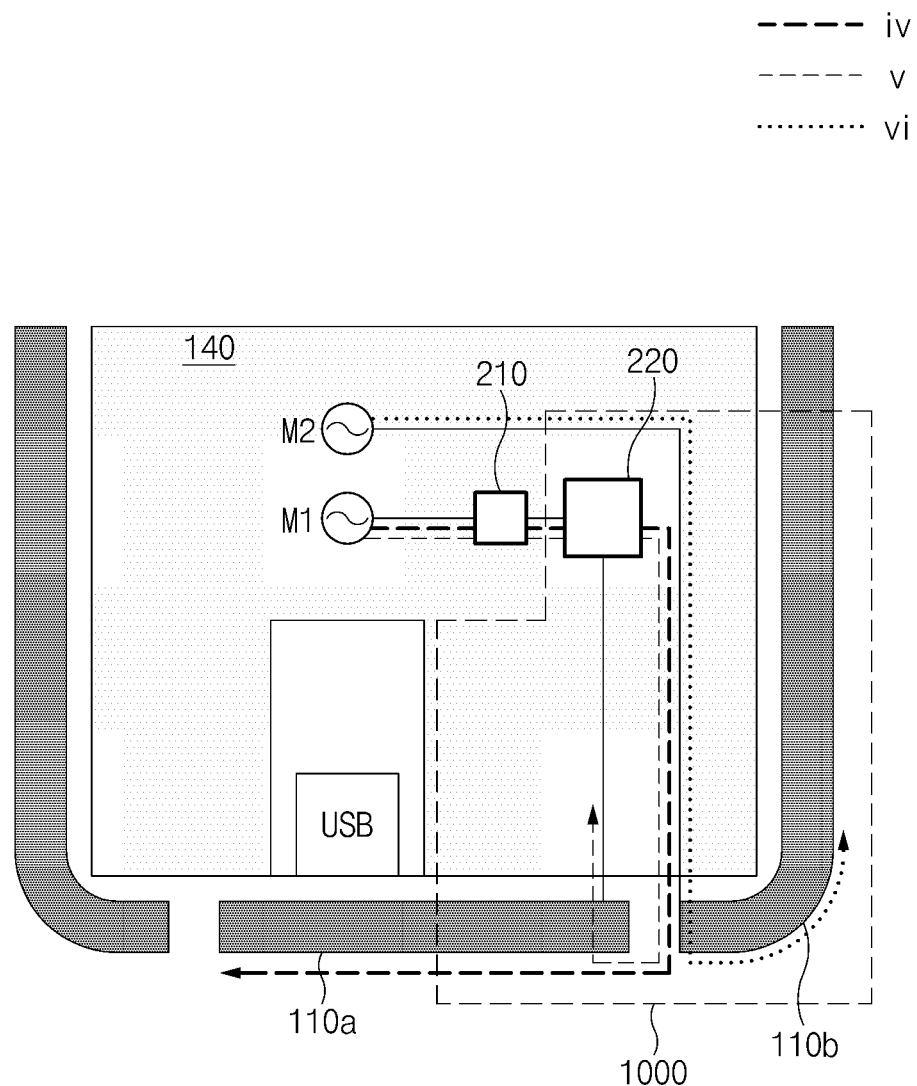
FIG. 10A is a diagram illustrating a feed structure of an electronic device, according to a seventh embodiment.
Figure 10B:
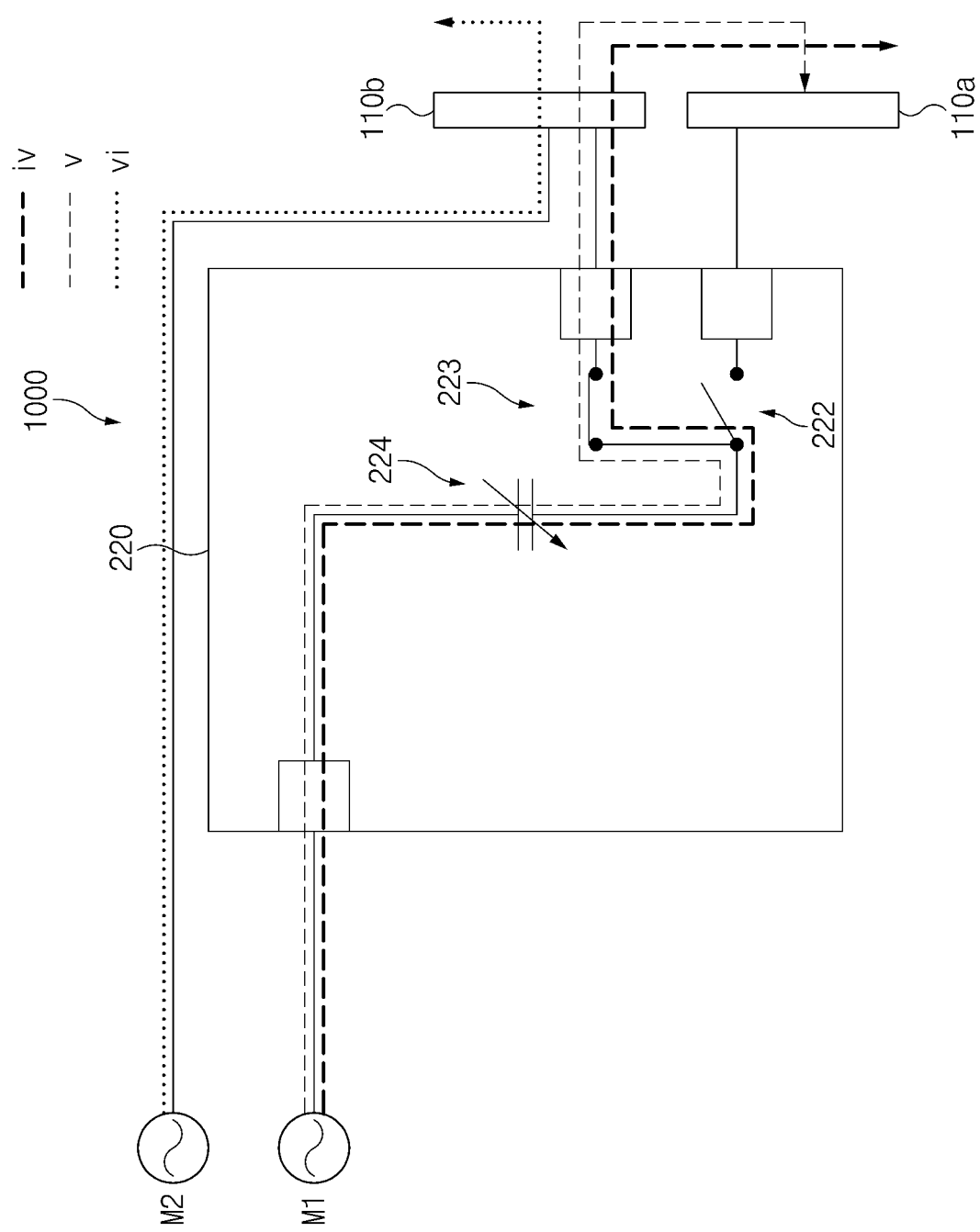
FIG. 10B is a diagram illustrating an enlarged view of a portion of a feed structure of an electronic device, according to the seventh embodiment.

FIG. 10A is a diagram illustrating a feed structure of an electronic device, according to a seventh embodiment. FIG. 10B is a diagram illustrating an enlarged view of a portion of a feed structure of an electronic device, according to the seventh embodiment. FIG. 10B is an enlarged view of a partial region 1000 illustrated in FIG. 10A.

Referring to FIG. 10A, the communication module 140p may transmit and/or receive a current to/from the first feed line M1 and/or the second feed line M2. In this case, the communication module 140p may control the switch 210 such that the first feed line M1 and the tuner 220 are connected. Also, the communication module 140p may control the tuner 220 such that the tuner 220 and the second antenna element 110b are connected. As such, a current transmitted and/or received through the first feed line M1 may flow to the second antenna element 110b through the first feed line M1, the switch 210, and the tuner 220. A current transmitted and/or received through the second feed line M2 may flow to the second antenna element 110b without passing through the tuner 220. In the case of the seventh embodiment, a current transmitted and/or received through the second feed line M2 may be introduced directly to the second antenna element 110b. In an embodiment, the switch 210 may be omitted, and the first feed line M1 and the tuner 220 may be directly connected.

Referring to FIG. 10B, the second switch 222 is turned off, and the third switch 223 is turned on. A current transmitted and/or received through the first feed line M1 may flow to the second antenna element 110b through the variable element 224 and the third switch 223. A current transmitted and/or received through the second feed line M2 may flow to the second antenna element 110b without passing through the tuner 220. When a current is fed to the second antenna element 110b, the electronic device 100 may transmit and/or receive signals in the low frequency band (e.g., ranging from about 800 MHz to about 900 MHz), the mid-frequency band (e.g., ranging from about 1700 MHz to about 2100 MHz), and/or the high frequency band (e.g., ranging from about 2500 MHz to about 2700 MHz) through path "iv", path "v", and/or path "vi", respectively.

An electronic device according to a comparative example fails to change a feed structure of the electronic device even though an operating environment of the electronic device is changed. However, the electronic device 100, according to an embodiment of the present disclosure, may stably maintain the performance of radiation of the electronic device 100 by changing a feed structure when an operating environment of the electronic device 100 is changed. For example, when an operating environment of the electronic device 100 is changed, the electronic device 100 may change the feed structure according to the sixth embodiment into the feed structure according to the seventh embodiment.

An electronic device 100, according to an embodiment of the disclosure, may include a housing (110, 120, 170), a first antenna element 110a and a second antenna element 110b that include different portions of the housing (110, 120, 170), a printed circuit board 140 that is disposed in the housing (110, 120, 170), a memory 140m that is disposed on the printed circuit board 140 and stores a feed condition for applying a current to the first antenna element 110a and the second antenna element 110b, a processor 140p that is disposed on the printed circuit board 140 and is electrically connected with the memory 140m, at least one feed line that is disposed on the printed circuit board 140 and is electrically connected with the processor 140p, and a tuner 120 that is electrically connected with the at least one feed line, the first antenna element 110a, and the second antenna element 110b. The processor may control the tuner 120 based on a first feed condition such that a first current flows to one of the first antenna element 110a and the second antenna element 110b, when the feed condition satisfies the first feed condition, and transmits and/or receives a signal in a specified frequency band based on an electrical path formed through the tuner 120.

When the feed condition satisfies a second feed condition, the processor 140p may control the tuner 120 based on the second feed condition, such that a second current flows to at least one of the first antenna element 110a and the second antenna element 110b.

The electronic device 100 may further include a first switch 120 that is disposed on a path through which the at least one feed line and the first antenna element 110a are connected, and a path through which the at least one feed line and the tuner 120 are connected.

The processor 140p may disconnect the first switch 210 from the tuner 120 such that the first switch 210 and the tuner 120 are isolated and may connect the first switch 210 and the first antenna element 110a, such that the first switch 210 and the first antenna element 110a are electrically connected.

The processor 140p may connect the first switch 210 and the tuner 120 such that the first switch 210 and the tuner 120 are electrically connected, and may disconnect the first switch 210 from the first antenna element 110a such that the first switch 210 and the first antenna element 110a are isolated.

The tuner 120 may include a second switch (221, 222, and 223) disposed in the tuner 120.

The processor 140p may turn on or may turn off the second switch (221, 222, and 223), such that the first current flows to at least one of the first antenna element 110a and the second antenna element 110b.

The processor 140p may transmit and/or receive a signal in a first frequency band through an electrical path formed through the tuner 120 and the first antenna element 110a, and may transmit and/or receive a signal in a second frequency band higher than the first frequency band through an electrical path formed through the tuner 120 and the second antenna element 110b.

The housing (110, 120, 170) may include a cover glass 120, a back cover 170 facing away from the cover glass 120, and a side member 110 surrounding a space between the cover glass 120 and the back cover 170.

The side member 110 may include a first edge extending in a first direction, a second edge parallel to the first edge, a third edge connecting one end of the first edge and one end of the second edge, and a fourth edge connecting an opposite end of the first edge and an opposite end of the second edge.

The first antenna element 110a may include at least a portion of the first edge, and the second antenna element 110b may include at least a portion of the third edge.

An electronic device 100, according to an embodiment of the disclosure, may include a housing (110, 120, 170) that includes a first plate 120, a second plate 170 facing away from the first plate 120, and a side member 110 surrounding a space between the first plate 120 and the second plate 170 and is connected with the second plate or is integrally formed with the second plate, wherein the side member 110 includes a first conduction part 110a, a second conduction part 110b, and an insulating part interposed between the first conduction part 110a and the second conduction part 110b, a printed circuit board 140 that is interposed between the first plate 120 and the second plate 170 and includes at least one ground layer, at least one wireless communication circuit 140p that is disposed at the printed circuit board 140 and includes a first electrical path processing a first signal in a first frequency band and a second electrical path processing a second signal in a second frequency band, and a control circuit 220 that includes a first node electrically connected with the first conduction part 110a, a second node electrically connected with the second conduction part 110b, a third node electrically connected with the first electrical path and the second electrical path, a first active element 224 that includes a first terminal and a second terminal, the first terminal being electrically connected with the third node, a first switch 222 electrically connected between the second terminal of the first active element 224 and the first node, and a second switch 223 electrically connected between the second terminal of the first active element 224 and the second node.

The electronic device 100 may further include a third switch that includes a first terminal electrically connected with the first electrical path, a second terminal electrically connected with the third node, and a third terminal electrically connected with the first conduction part.

The control circuit 220 may further include a fourth node electrically connected with the third node, and a fourth switch including a first terminal electrically connected with the fourth node and a second terminal electrically connected with the second node of the first active element.

The control circuit 220 may further include a fifth node electrically connected with the second terminal of the fourth switch and the second terminal of the first active element.

The control circuit 220 may further include a sixth node electrically connected with the second terminal of the first active element 224 and the fifth node.

The control circuit 220 may further include a seventh node electrically connected with the sixth node, the first switch 222, and the second switch 223.

The control circuit 220 may further include an eighth node electrically connected with the second node and the second conduction part 110b, and a second active element electrically connected between the eighth node and the ground layer.

The control circuit 220 may further include a ninth node, a tenth node, and at least one passive element electrically connected between the ninth node and the tenth node.

The control circuit 220 may further include a fifth switch electrically connected between the ninth node and the tenth node.

The control circuit may further include a sixth switch electrically connected between the ninth node and the ground layer.

The first frequency band according to an embodiment of the disclosure may range from about 600 Hz to about 1000 Hz, and the second frequency band may range from about 1000 Hz to about 5000 Hz.

Figure 11:
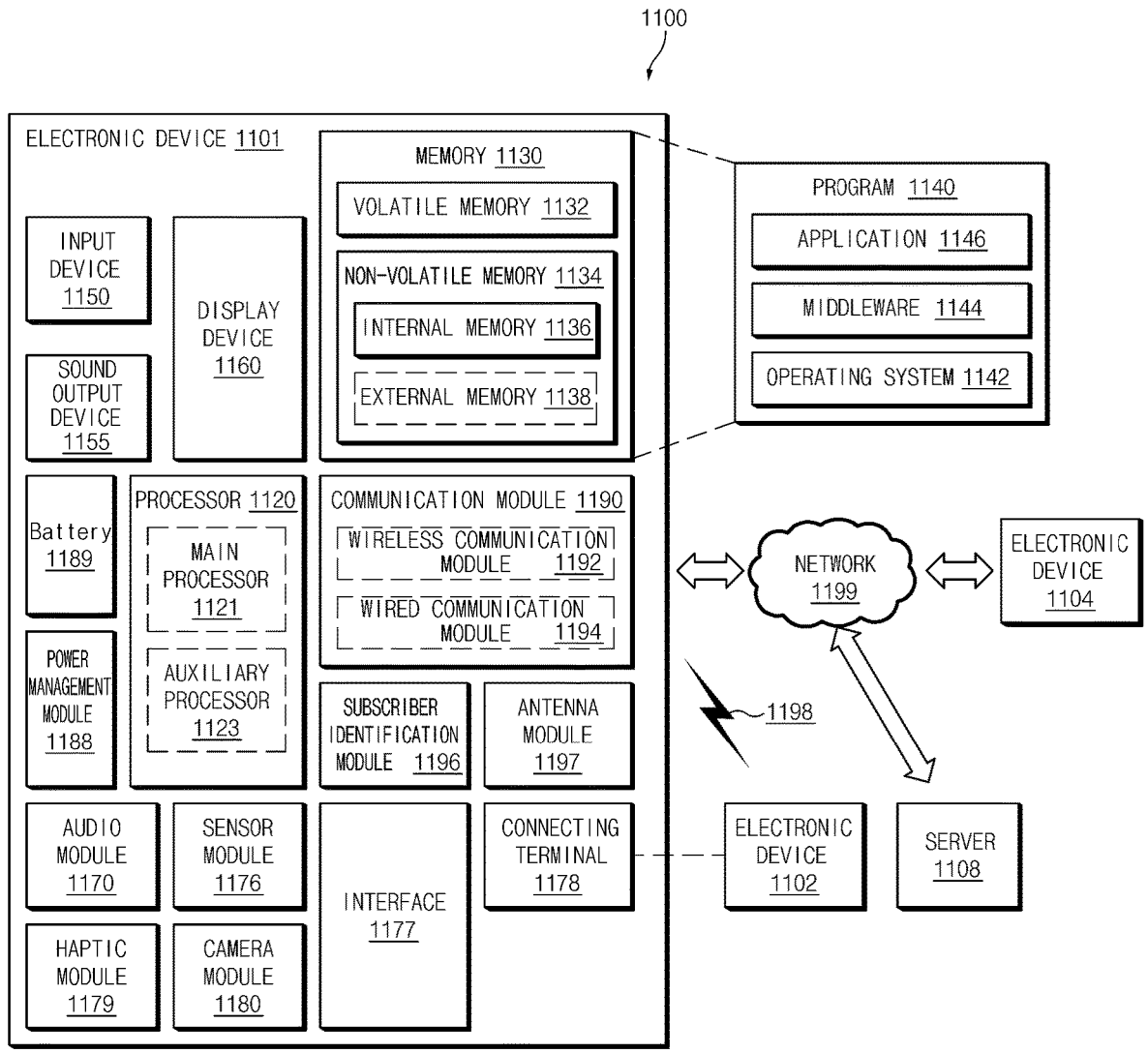
FIG. 11 is a block diagram illustrating an electronic device in a network environment, according to an embodiment.

FIG. 11 is a block diagram illustrating an electronic device in a network environment, according to an embodiment.

Referring to FIG. 11, an electronic device 1101 (e.g., the electronic device 100 in FIG. 1) may communicate with an electronic device 1102 through a first network 1198 (e.g., a short-range wireless communication network) or may communicate with an electronic device 1104 or a server 1108 through a second network 1199 (e.g., a long-distance wireless communication network) in a network environment 1100. The electronic device 1101 may communicate with the electronic device 1104 through the server 1108. The electronic device 1101 includes a processor 1120, a memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module 1196, or an antenna module 1197. At least one (e.g., the display device 1160 or the camera module 1180) among components of the electronic device 1101 may be omitted or one or more other components may be added to the electronic device 1101. Some of the above components may be implemented with a single integrated circuit. For example, the sensor module 1176 (e.g., a fingerprint sensor, an iris sensor, or an illuminance sensor) may be embedded in the display device 1160 (e.g., a display).

The processor 1120 may execute, for example, software (e.g., a program 1140) to control at least one of other components (e.g., a hardware or software component) of the electronic device 1101 connected to the processor 1120 and may process or compute a variety of data. As a part of data processing or operation, the processor 1120 may load a command set or data, which is received from other components (e.g., the sensor module 1176 or the communication module 1190), into a volatile memory 1132, may process the command or data loaded into the volatile memory 1132, and may store result data into a nonvolatile memory 1134. The processor 1120 may include a main processor 1121 (e.g., a central processing unit or an application processor) and an auxiliary processor 1123 (e.g., a graphic processing device, an image signal processor, a sensor hub processor, or a communication processor), which operates independently from the main processor 1121 or with the main processor 1121. Additionally or alternatively, the auxiliary processor 1123 may use less power than the main processor 1121, or is specified to a designated function. The auxiliary processor 1123 may be implemented separately from the main processor 1121 or as a part thereof.

The auxiliary processor 1123 may control, for example, at least some of functions or states associated with at least one component (e.g., the display device 1160, the sensor module 1176, or the communication module 1190) among the components of the electronic device 1101 instead of the main processor 1121 while the main processor 1121 is in an inactive (e.g., sleep) state or together with the main processor 1121 while the main processor 1121 is in an active (e.g., an application execution) state. The auxiliary processor 1123 (e.g., the image signal processor or the communication processor) may be implemented as a part of another component (e.g., the camera module 1180 or the communication module 1190) that is functionally related to the auxiliary processor 1123.

The memory 1130 may store a variety of data used by at least one component (e.g., the processor 1120 or the sensor module 1176) of the electronic device 1101. For example, data may include software (e.g., the program 1140) and input data or output data with respect to commands associated with the software. The memory 1130 may include the volatile memory 1132 or the nonvolatile memory 1134.

The program 1140 may be stored in the memory 1130 as software and may include, for example, an operating system 1142, a middleware 1144, or an application 1146.

The input device 1150 may receive a command or data, which is used for a component (e.g., the processor 1120) of the electronic device 1101, from an outside (e.g., a user) of the electronic device 1101. The input device 1150 may include, for example, a microphone, a mouse, a keyboard, or a digital pen (e.g., a stylus pen).

The sound output device 1155 may output a sound signal to the outside of the electronic device 1101. The sound output device 1155 may include, for example, a speaker or a receiver. The speaker may be used for general purposes, such as multimedia play or recordings play, and the receiver may be used for receiving calls. The receiver and the speaker may be either integrally or separately implemented.

The display device 1160 may visually provide information to the outside (e.g., the user) of the electronic device 1101. For example, the display device 1160 may include a display, a hologram device, or a projector and a control circuit for controlling a corresponding device. The display device 1160 may include a touch circuitry configured to sense the touch or a sensor circuit (e.g., a pressure sensor) for measuring an intensity of pressure on the touch.

The audio module 1170 may convert a sound and an electrical signal in dual directions. According to an embodiment, the audio module 1170 may obtain the sound through the input device 1150 or may output the sound through the sound output device 1155 or an external electronic device (e.g., the electronic device 1102 (e.g., a speaker or a headphone)) directly or wirelessly connected to the electronic device 1101.

The sensor module 1176 may generate an electrical signal or a data value corresponding to an operating state (e.g., power or temperature) inside or an environmental state (e.g., a user state) outside the electronic device 1101. The sensor module 1176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1177 may support one or more designated protocols to allow the electronic device 1101 to connect directly or wirelessly to the external electronic device (e.g., the electronic device 1102). The interface 1177 may include, for example, an HDMI, a USB interface, an SD card interface, or an audio interface.

A connecting terminal 1178 may include a connector that physically connects the electronic device 1101 to the external electronic device (e.g., the electronic device 1102). The connecting terminal 1178 may include, for example, an HDMI connector, a USB connector, an SD card connector, or an audio connector (e.g., a headphone connector).

The haptic module 1179 may convert an electrical signal to a mechanical stimulation (e.g., vibration or movement) or an electrical stimulation perceived by the user through tactile or kinesthetic sensations. The haptic module 1179 may include a motor, a piezoelectric element, or an electric stimulator.

The camera module 1180 may shoot a still image or a video image. The camera module 1180 may include, for example, at least one or more lenses, image sensors, image signal processors, or flashes.

The power management module 1188 may manage power supplied to the electronic device 1101. The power management module 1188 may be implemented as at least a part of a power management integrated circuit (PMIC).

The battery 1189 may supply power to at least one component of the electronic device 1101. The battery 1189 may include, for example, a non-rechargeable (primary) battery, a rechargeable (secondary) battery, or a fuel cell.

The communication module 1190 may establish a direct (e.g., wired) or wireless communication channel between the electronic device 1101 and the external electronic device (e.g., the electronic device 1102, the electronic device 1104, or the server 1108) and support communication execution through the established communication channel. The communication module 1190 may include at least one communication processor operating independently from the processor 1120 (e.g., the application processor) and supporting the direct (e.g., wired) communication or the wireless communication. The communication module 1190 may include a wireless communication module 1192 (e.g., a cellular communication module, a short-range wireless communication module, or a GNSS (global navigation satellite system) communication module) or a wired communication module 1194 (e.g., an LAN (local area network) communication module or a power line communication module). The corresponding communication module among the above communication modules may communicate with the external electronic device through the first network 1198 (e.g., the short-range communication network such as a Bluetooth, a WiFi direct, or an IrDA (infrared data association)) or the second network 1199 (e.g., the long-distance wireless communication network such as a cellular network, an internet, or a computer network (e.g., LAN or WAN)). The above-mentioned various communication modules may be implemented into one component (e.g., a single chip) or into separate components (e.g., chips), respectively. The wireless communication module 1192 may identify and authenticate the electronic device 1101 using user information (e.g., international mobile subscriber identity (IMSI)) stored in the subscriber identification module 1196 in the communication network, such as the first network 1198 or the second network 1199.

The antenna module 1197 may transmit or receive a signal or power to or from the outside (e.g., an external electronic device). The antenna module 1197 may include one or more antennas. For example, the communication module 1190 may select one antenna suitable for a communication method used in the communication network such as the first network 1198 or the second network 1199. The signal or power may be transmitted or received between the communication module 1190 and the external electronic device through the selected one antenna.

At least some components among the components may be connected to each other through a communication method (e.g., a bus, a GPIO (general purpose input and output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1101 and the external electronic device 1104 through the server 1108 connected to the second network 1199. Each of the electronic devices 1102 and 1104 may be the same as or different types from the electronic device 1101. All or some of the operations performed by the electronic device 1101 may be performed by one or more external electronic devices among the external electronic devices 1102, 1104, or 1108. For example, when the electronic device 1101 performs some functions or services automatically or by request from a user or another device, the electronic device 1101 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 1101. The electronic device 1101 may provide the result as is or after additional processing as at least a part of the response to the request. To this end, for example, a cloud computing, distributed computing, or client-server computing technology may be used.

An electronic device, according to various embodiments herein, may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

Various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". A "module" may be a minimum unit of an integrated part or may be a part thereof. A "module" may be a minimum unit for performing one or more functions or a part thereof. For example, according to an embodiment, a "module" may include an application-specific integrated circuit (ASIC).

Various embodiments of the disclosure may be implemented by software (e.g., the program 1140) including an instruction stored in a machine-readable storage medium (e.g., an internal memory 1136 or an external memory 1138) readable by a machine (e.g., the electronic device 1101). For example, the processor (e.g., the processor 1120) of a machine (e.g., the electronic device 1101) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

A method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

Each component (e.g., the module or the program) of the above-described components may include one or plural entities. At least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

According to embodiments of the disclosure, radiation performance of an antenna may be stably maintained even though an operating environment of an electronic device is changed. Also, according to embodiments of the disclosure, the performance of radiation of an antenna may be maximized under the following conditions: a decrease in a signal transmission and/or reception rate to a weak electric field condition of a radio wave, a decrease in performance of an antenna due to a contact of a user, or a change of a feed point or a feed path of an antenna to a use condition of the user with regard to a specific band.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a housing;
a first antenna element including a first portion of the housing;
a second antenna element including a second portion of the housing that is different from the first portion of the housing;
a printed circuit board disposed in the housing;
a memory disposed on the printed circuit board, and configured to store feed conditions, each of the feed conditions for applying a current to one of the first antenna element and the second antenna element;
a processor disposed on the printed circuit board and electrically connected with the memory;
a first feed line and a second feed line disposed on the printed circuit board and electrically connected with the processor; and
a tuner electrically connected with the first feed line, the second feed line, the first antenna element, and the second antenna element, wherein the tuner comprises a first switch selectively connecting the first feed line to the second feed line, a second switch selectively connecting the second feed line to the first antenna element, and a third switch selectively connecting the second feed line to the second antenna element;
wherein the processor is configured to:
control the tuner such that a first current flows to one of the first antenna element and the second antenna element, based on a first feed condition of the stored feed conditions; and
transmit or receive a signal in a specified frequency band based on an electrical path formed through the tuner.

2. The electronic device of claim 1, wherein the processor controls the tuner such that a second current flows to one of the first antenna element and the second antenna element, based on a second feed condition of the stored feed conditions.

3. The electronic device of claim 1, further comprising:
a fourth switch disposed on a path through which the first feed line and the first antenna element are connected and a path through which the first feed line and the tuner are connected.

4. The electronic device of claim 3, wherein the processor disconnects the fourth switch from the tuner such that the first switch and the tuner are isolated and connects the first switch and the first antenna element such that the first switch and the first antenna element are electrically connected.

5. The electronic device of claim 3, wherein the processor connects the fourth switch and the tuner such that the first switch and the tuner are electrically connected and disconnects the first switch from the first antenna element such that the first switch and the first antenna element are isolated.

6. The electronic device of claim 1, wherein the processor turns on or turns off the first switch such that the first current flows to one of the first antenna element and the second antenna element.

7. The electronic device of claim 1, wherein the processor transmits or receives a signal in a first frequency band through an electrical path formed through the tuner and the first antenna element, and transmits or receives a signal in a second frequency band higher than the first frequency band through an electrical path formed through the tuner and the second antenna element.

8. The electronic device of claim 1, wherein:
the housing includes a glass cover, a back cover facing away from the glass cover, and a side member surrounding a space between the glass cover and the back cover;

the side member includes a first edge extending in a first direction, a second edge parallel to the first edge, a third edge connecting one end of the first edge and one end of the second edge, and a fourth edge connecting an opposite end of the first edge and an opposite end of the second edge; and the first antenna element includes at least a portion of the first edge, and the second antenna element includes at least a portion of the third edge.

* * * * *